(12) United States Patent
Schultz et al.

(10) Patent No.: US 9,037,708 B2
(45) Date of Patent: May 19, 2015

(54) REMOTE CONTROL ARRANGEMENT

(71) Applicant: XPED HOLDINGS PTY LTD, Mawson Lakes (AU)

(72) Inventors: John Schultz, Forreston (AU); Christopher Wood, Beaumont (AU)

(73) Assignee: XPED Holdings PTY Ltd. (AU)

( * ) Notice: Subject to any disclaimer, the term of this patent is extended or adjusted under 35 U.S.C. 154(b) by 0 days.

(21) Appl. No.: 14/174,940

(22) Filed: Feb. 7, 2014

(65) Prior Publication Data

US 2014/0154983 A1 Jun. 5, 2014

Related U.S. Application Data

(63) Continuation of application No. 13/386,659, filed as application No. PCT/AU2010/000938 on Jul. 26, 2010.

(30) Foreign Application Priority Data

Jul. 24, 2009 (AU) ................................ 2009903473

(51) Int. Cl.
*G06F 15/16* (2006.01)
*H04B 5/00* (2006.01)
*G06F 3/0482* (2013.01)
(Continued)

(52) U.S. Cl.
CPC ............ *H04B 5/0031* (2013.01); *G06F 3/0482* (2013.01); *G06F 3/0488* (2013.01); *G06Q 30/02* (2013.01); *H04N 5/4403* (2013.01); *H04N 7/17318* (2013.01); *H04N 21/235* (2013.01); *H04N 21/4126* (2013.01); *H04N 21/435* (2013.01); *H04N 21/4722* (2013.01); *H04N 21/47815* (2013.01); *H04N 21/4784* (2013.01); *H04N 21/482* (2013.01); (Continued)

(58) Field of Classification Search
USPC ................................................... 709/203, 224
See application file for complete search history.

(56) References Cited

U.S. PATENT DOCUMENTS 6,002,450 A * 12/1999 Darbee et al. ................. 348/734
8,275,312 B2    9/2012 Fisher
(Continued)

FOREIGN PATENT DOCUMENTS

WO        03032500 A2    4/2003

OTHER PUBLICATIONS

Supplementary European Search Report—EP App No. 10 80 1808.
(Continued)

*Primary Examiner* — Ebrahim Golabbakhsh
(74) *Attorney, Agent, or Firm* — Fox Rothschild LLP; Richard C. Woodbridge; Ryan N. Miller

(57) ABSTRACT

The present invention related generally to an arrangement for delivering information to the user of a mobile device where the information presented to the user is associated with information that has a temporal or contextual or location based association with other information also presented to the user. In one example the mobile device is a devices used to remotely control one or more controllable devices, such as a television, personal video recorder, and/or digital radio receiver, and additional multi-media information is made available to the user interface of the remote control to the user at the time the source information is being viewed/listened to or provided to the user regardless of when the source was generated or broadcast.

17 Claims, 29 Drawing Sheets

(51) Int. Cl.

| | | |
|---|---|---|
| *G06F 3/0488* | (2013.01) | |
| *G06Q 30/02* | (2012.01) | |
| *H04N 5/44* | (2011.01) | |
| *H04N 7/173* | (2011.01) | |
| *H04N 21/235* | (2011.01) | |
| *H04N 21/41* | (2011.01) | |
| *H04N 21/435* | (2011.01) | |
| *H04N 21/4722* | (2011.01) | |
| *H04N 21/478* | (2011.01) | |
| *H04N 21/4784* | (2011.01) | |
| *H04N 21/482* | (2011.01) | |
| *H04N 21/81* | (2011.01) | |
| *H04N 21/858* | (2011.01) | |

(52) U.S. Cl.
CPC .......... *H04N 21/812* (2013.01); *H04N 21/858* (2013.01); *H04N 2005/441* (2013.01)

(56) References Cited

U.S. PATENT DOCUMENTS

| | | |
|---|---|---|
| 8,290,433 B2 | 10/2012 | Fisher et al. |
| 8,332,272 B2 | 12/2012 | Fisher |
| 8,352,323 B2 | 1/2013 | Fisher |
| 2002/0144262 A1 | 10/2002 | Plotnick et al. |
| 2003/0037068 A1 | 2/2003 | Thomas et al. |
| 2003/0149621 A1* | 8/2003 | Shteyn .............. 705/14 |
| 2005/0114511 A1* | 5/2005 | Davis et al. ............ 709/226 |
| 2005/0210417 A1 | 9/2005 | Marvit et al. |
| 2007/0115828 A1* | 5/2007 | Ahuja et al. .......... 370/236 |
| 2007/0156436 A1 | 7/2007 | Fisher et al. |
| 2009/0034450 A1* | 2/2009 | Urner .............. 370/328 |
| 2009/0070819 A1* | 3/2009 | Gajda et al. ............ 725/46 |
| 2011/0191156 A1* | 8/2011 | Etheredge et al. ......... 705/14.25 |
| 2013/0080241 A1 | 3/2013 | Fisher |

OTHER PUBLICATIONS

Interactive Television: From Wikipedia, the free encyclopedia; 8 pages.

Mobile Television; from Wikipedia, the free encyclopedia—5 pages.

Cesar et al., "Usages of the secondary screen in an interative television evironment: control, enrich, share, and transfer television content," EuroITV 2008: LNCS 5066, pp. 168-177.

* cited by examiner

User Selecting a TV Channel

User Selected Streaming Source

Distorted Image during Fast Forward

Still or Slow Video directed to Screen during Fast Forward

Picture in Picture being utilised during Fast Forward

REMOTE CONTROL ARRANGEMENT

The present invention relates generally to an arrangement for delivering information to the user of a mobile device where the information presented to the user is associated with information that has a temporal or contextual or location based association with other information also presented to the user.

BACKGROUND

The advertising and promotion industry relies on its ability to deliver information to people which changes or influences their behaviour. Broadcast television is but one of the multiple information delivery mediums and for advertisers the multi-media advertisement broadcast during a television programme is intended to influence people to purchase, use, consider, and reinforce the benefits of a product or service or both. In the promotion industry delivering information about an event, person, place, or thing can use radio, television, and spruiking during an event, and other methods for delivering information that promotes, encourages, and sells those things.

This type of information delivery is sometimes referred to as push advertising/promotion, that is, the delivery of information is pushed out by the advertiser and promoter to the person viewing the broadcast or attending an event.

It should be noted that television and events are not the only vehicles by which and from which advertising and promotion can be achieved during those events. Other vehicles include using the world wide network of computers and systems available to a user of the network, word of mouth, print, and posters.

The timing of the broadcast, the timing of the advertisements during the broadcast, and the timing of events, presence of the person, place, or thing, requires the attention of the people viewing or attending or in proximity to the person, place, or thing. Furthermore, even though the attention of the person is available, they may not then be in a position to act on or further review the information delivered to them in those situations.

The problems described are addressed at least in part by the approach described and disclosed in this specification.

BRIEF DESCRIPTION OF THE INVENTION

In a broad aspect of the invention a multimedia control and presentation device for receiving and providing to a user of the device, additional multi-media data associated with source multi-media content accessible by the user of the arrangement, includes, a device having a processor, memory having some or none additional multi-media data, one or more wireless communication mechanisms, and a user interface mechanism which provides a user activated input for directly or indirectly identifying a source multi-media content accessible to the user and activation of either a check of the device memory for additional multi-media data and/or activation of the use of the one or more wireless communication mechanisms to transmit a request for additional multi-media data and receive additional multi-media data to be made available to the memory of the mobile device, and using the processor and memory of the mobile device to control the user interface mechanism to present content representative of the additional multi-media data to the user of the mobile device.

In another broad aspect of the invention a system for controlling the presentation of content representative of the additional multi-media data associated at least temporally with source multi-media content, the source multi-media content being accessible by the user of the arrangement and the additional multi-media content being made available to a user of a mobile device, the system including: a mobile device having a processor, memory having some or none additional multi-media data, one or more wireless communication mechanisms, and a user interface mechanism which provides a user activated input for directly or indirectly identifying a source multi-media content accessible to the user and activation of either a check of the device memory for additional multi-media data and/or activation of the use of the one or more wireless communication mechanisms to transmit a request for additional multi-media content and receive additional multi-media data to be made available to the memory of the mobile device, and using the processor and memory of the mobile device to control the user interface mechanism to present content representative of the additional multi-media data to the user of the mobile device, and a remote digital data memory being a source of additional multi-media content accessible by the mobile device using one or more wireless communication mechanisms.

By way of explanation only, information in digital form is referred to herein as multi-media data. Source multi-media content is that data which is received (possibly viewed and heard by the user of the mobile device) within a time period by a person and in this invention that person is a user of a mobile device. An example of source multi-media content includes but is not limited by the following example, a broadcast TV programme received by a device that displays and makes audible the TV programme and viewable by the user of a mobile device.

Additional multi-media data is data related to the source multi-media content and accessible by the mobile device during the time period that the source multi-media content is being accessed or even at a later time. Examples of additional multi-media data includes but is not limited by the following examples, URL/s to a file providing additional information about the TV programme subject matter, image/s related to the TV programme subject matter, electronic programme guide, digital data voucher, digital data receipt, digital data token, and a digital data ticket.

The above digital data voucher, digital data receipt, digital data token, and a digital data ticket related to the source multi-media content such as an advertisements during a TV programme.

Trigger-able token/s relating to advertisements or the TV broadcaster (including media data (i.e. image/s, multimedia and trigger data)) are another example of the additional multi-media data that may be available.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Details concerning computers, computer networking, software programming, telecommunications and the like may at times not be specifically illustrated as such were not considered necessary to obtain a complete understanding nor to limit a person skilled in the art in performing the invention, are considered present nevertheless as such are considered to be within the skills of persons of ordinary skill in the art.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchange ability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

BRIEF DESCRIPTION OF THE FIGURES

FIG. 24a shows a distorted image as seen on the screen of a television set during fast forwarding a recorded source program, in FIG. 24b the display of a predetermined advertisement during the fast forward operation, and an inset version of the display of FIG. 24b is shown in FIG. 24c;

DETAILED DESCRIPTION OF EMBODIMENTS OF THE INVENTION

Figure 1:
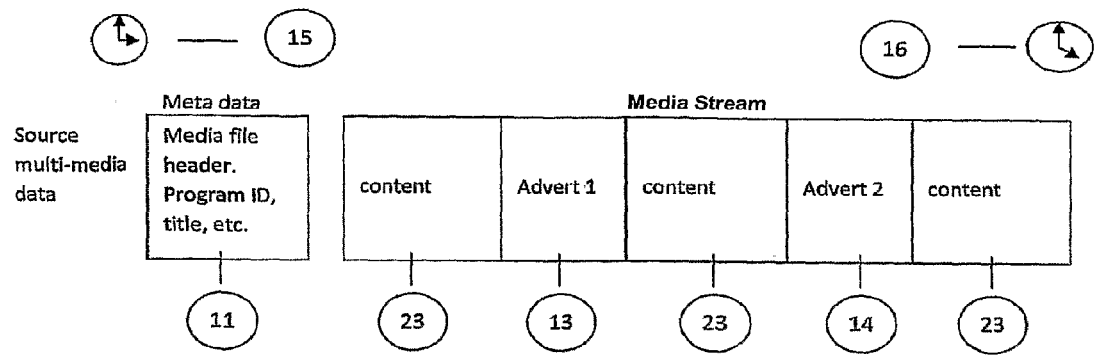
FIG. 1 shows schematically an example of how source multi-media data is broadcast.

This invention provides in one embodiment a way of being able to provide a method and medium for information, messages, information, tokens or advertisements during times when a mobile (in at least one embodiment) a remote control device of a media play unit, such as a television set, or radio or a media player such as a Digital Versatile Disc (DVD) player, is being controlled, for the most part to remove or alter such messages, information and advertisements and so forth being presented to the user.

The invention also relates in part to a means of electronic exchange of information between the provider of the information, advertisements, public service announcements and so forth, with the consumer of this provided material through an electronic hand held device.

Yet another aspect of the invention relates to the ability for a mobile device to use a combination of methods and apparatus to form in effect, an understanding of user habits, both related to the daily routine of the user and also personal preferences of the user to provide the ability to filter, modify or effect how or what information is presented to the user, which in turn not only benefits the user and content providers, but can also assists in safeguarding the user through providing warnings as a result of inappropriate actions or inactions.

The implementation of this invention when used by many users may result in large numbers users requesting additional multi-media data and thus being accessed simultaneously from one or more databases and web servers. Additionally therefore this invention provides a solution to the side effect problem that can potentially arise which includes the inability to service all users with the requested additional multi-media data. It is therefore the intent of this invention to provide a number of interrelated solutions to this problem that result in system wide benefits to the content provider, the broadcaster and finally the receiver of the source multi-media data.

It should be noted that the term "user" in the context of this invention must be taken as simply the person to whom the multi-media data is delivered to or viewed by, by way of several multi-media mediums which can include audio, video or both, irrespective of whether it is delivered through a form of broadcast media, accessed through the internet or played from pre pre-recorded media.

A number of examples will follow showing preferred embodiments and are presented in such a way so as to show how the invention could be applied in restrictive applications but should not be considered as defining the only way in which the invention can be provided.

One of the major revenue streams enjoyed by television and radio networks, particularly commercially orientated organisations, is the ability to service advertisers who are wish to market their product during the broadcast of particular programmes.

The more popular the programme, the more consumers it attracts and so a larger potential audience to which the marketer can present his or her wares or services for the hopeful development of commercial exploitation.

For some time there has been available with most appliances an associated remote control which, when used with a multi-media record and replay device such as Personal Video Recorder (PVR) or DVD player, has had the ability to fast forward or pause programs that have been pre-recorded. Such devices and others such as TV remotes are also generally equipped with a mute button that allows for the sound to be reduced or even totally removed, the function of which is often used during advertisement which often seems to have elevated audio levels compared with the content of the regularly consumed program.

There are also now available to members of the purchasing public a wide variety of electronic devices and so forth, which would allow the user to record digital programs with the ability to automatically blank out advertisement and so forth.

Several providers have now entered most global markets including TiVo, Ice TV, and the likes, where users pay a subscription fee or the like and the provider then transmits an Electronic Programming Guide (EPG) that allows the user to automatically record programmes and remove advertisements with the touch of button.

Hence, technology is available that will allow users the ability, through "time-shifting", to be able to stop commercial stations dictating when viewers can consume their choice of programming. User are no longer forced to sit through commercials while replaying a recorded programme through a PVR or live content via a Set Top Box (STB) or digital radio and so forth, as the user will now be able to fast forward through the commercials and promotional messages.

The advertisement or television industry would recognise the financial consequence to loss of advertising effectiveness.

Accordingly in one embodiment a device and, arrangement provides the ability to obtain in a less obtrusive, opt-in, and more convenient manner, additional multi-media data associated with a source multi-media data such as for example, television and radio stations and the like. In particular advertisers and other such enterprises and content providers will then be provided a means by which they can present messages, information and advertisements to the audience to which the source content is directed, including through the use of broadcasted media, despite the fact that these consumers may have the technology that allows them the use of a remote control, particularly when the consumer has manipulated the viewing or listening environment for which the content was designed, by deleting, fast forwarding, time shifting or simply muting the sound through the touch of a button.

One embodiment of this invention, allows additional information to be automatically presented to the user of a remote control, on the remote control during the time where a muted or sound reduced state has been entered as a result of the user interacting with the remote control.

If the user has pressed the mute button to remove audio from the advert or the like, a more appropriately designed advert, one that could be designed specifically for a sound impaired environment, could be presented to the viewer in replacement of the original. Or additionally by example, a series of captions, words, slogans or other messages could appear on the screen of the remote control facilitating the message intent of the advert to be presented to the prospective audience where, without this mechanism, the intent would have otherwise been lost or reduced.

So in this example an advert viewed without sound may in fact completely fail in conveying to the viewer the desirability of the appliance on offer. However, during this time, the remote control has detected that the sound has been muted and triggered an event causing an alternative action, in this case a caption being presented or overlayed with the advert as it plays out on the screen, that puts the offer or desirability into the written word. Thus the viewer has received the intended message of the content provider even when the sound has been removed.

Another embodiment of this invention, automatically allows alternative additional information to be presented to the user during times where the content is fast forwarded, rewound or paused as a result of the user interacting with the remote control.

As a person skilled in the art would appreciate, when fast forward or similar controls are pressed on the remote control to manipulate or change the image on screen, all sound is lost from the broadcast, as can be expected as the viewer presses the functionality of fast forward and watches the television commercials speeding through with a obliterated and distorted pictures.

During this time of fast forwarding, rewinding, pausing or similar functions are actuated, the remote control, TV, STB, DVD player or the like, can detect this action and simultaneously in real time present pictures and or sound that in fact replace the distorted images with stationary or appropriately slowed images in order to have a legible image or message presented to the viewer. As previously mentioned, captions can also be added to this alternative content to compensate for the lost audio.

So in this example an advert that is being fast forwarded, now without a legible picture or sound, also has failed to convey to the viewer that the advantages and image associated with having a particular appliance. However, during this time, the remote control and the devices controlled being the controllable devices, such as a TV, DVD player or the like, has detected that the user is fast forwarding and thus triggered an event causing an alternative action, in this case an alternative multi-media video source, possibly a still image of the latest appliance with the caption being presented or overlayed. Once again the viewer has now received the message intent of the content provider even when the picture has been distorted through the action of fast forwarding and the sound has been removed.

As one skilled in the art will also recognise, televisions, in particular digital TV's and other appliances have developed functionality that exceeds the simple single task for which that appliance was traditionally created. For example, digital televisions no longer just receive television broadcast material, but can now interface with a multitude of other devices through wireless and multimedia interfaces, allowing content to be streamed from several sources. Many units also include multiple tuners, therefore having the ability to also receive more than one broadcast simultaneously.

Digital television broadcasters have available to them a number of channels over which data can be sent. Often these channels can be used for Electronic or Interactive Program Guides or video streaming of content in alternative resolution formats to accommodate viewing on lower resolution displays or distant receivers.

It is one embodiment therefore that the alternative content be streamed from a second broadcast source, one of the available broadcast channels, or received through one of the alternative multimedia inputs from a STB or the like, which in itself could be the source of the alternative additional multimedia data content.

The display of this content could be presented on the main viewing screen of the television, replacing the distorted fast forwarded images, or be presented as part of the television's picture in picture mechanism as a clear and legible video stream. It would be expected then that the user of the remote control would have an additional opportunity to see this clear image, thus providing an additional means for the content provider to get the advertised message to the viewer where it would otherwise be lost.

In another situation that can occur with equipment that does not provide the live pausing feature, when a program is being watched live, that is it is not time shifted through pre recording and replaying at a later time, there exists no way of fast forwarding or removing the advertising from the program, so the viewer must endure the full effect of the advertising campaigns. However, with this invention, the viewer can be presented additional information that may complement the program topics and present to the viewer a number of more appealing options to pass the time while adverts, which may represent no topical interest to the viewer, are being presented.

However advantageously, this invention can provide a continuous stream of potentially unrelated advertisements and information, to provide a mechanism that allows an additional or alternative set of adverts or messages, that upon interaction with the user or through an understanding of the user preferences, provides the user content that has been tailored for that user's or demographics preferences or interests.

Hence it is possible to provide an alternative and potentially more effective targeting of information to a selected demographic or an individual user, over a broadcast medium such as TV or radio, distributed content such as DVD, or even time shifted content where the real time advantages originally intended by the content provider or advertiser have been lost.

In addition to a system that has been developed to be advantageous to advertisers, service and content providers, TV and radio stations and the like, significant benefits can also be realised by the consumers, or viewers of the programs.

Accordingly in one form of the invention, although this need not be the only nor indeed the broadest form of the invention, there is provided a hand-held remote control or mobile device adapted to control the content being consumed, such as by way of a television, radio or computer monitor through the use of buttons, touch screen, voice recognition, gestures or optical recognition.

Additionally, said mobile device would be equipped with a display and or speakers for presenting information such as control buttons, widgets and the like, user prompts, messages, tokens/coupons, public service announcements and other content for the viewing, listening and interaction of the user.

In some embodiments the device could include accelerometers and so forth, so that even picking up the device, registers as an event for information to be displayed on the display of the remote control or other device screen, or data exchanged through the provider or external source. Additionally other events can be used for this information or data control such as, to be able to detect the presence of the user using video recognition, capacitive or other proximity sensing, heat sensing or the like.

In another embodiment the device could include a camera for the purpose of user recognition, so user preferences could be provided to the screen reflective of that individual users preferences, even where several users may have access to and use the remote control.

Advantageously there can be provided a separate medium other than just the television screen, radio speaker or monitor per se to which information, messages, advertisements and so forth can be delivered thereon.

Hence, while in the past through the advent of improved technology, particularly with the use of digital TV, people have been able to record programmes and watch them at preferred times, but with this embodiment even with the touch of a button of the remote control they are able to remove or fast forward through commercials, there will still be a medium available, even if it is only momentary, that when the user presses that remote control button to bring about the effect of fast tracking, rewinding, pausing, skipping, muting or deleting a commercial from the television screen there will be illumination of a displayed message, logo or announcement upon the remote control device.

In preference the message would be an additional multimedia stream of sound and picture.

Advantageously in this arrangement the remote control has the ability that as soon as one of the user interface (possibly a touch sensitive graphical interface) operating keys or tabs are pressed or touched by the user, visualisation is realised upon the screen of the remote control, for example by way of an advertisement installment or other information, token or message, by way of example.

There is a greater trend for consumers to download content over the Web from content providers of their choice. This market shift has been in part due to the introduction of a wider number of internet connected devices such as portable media players, internet connected tablet computers, content and internet plans being provided on mobile phones, etc. This has lead to a generation of consumers with a "buy it now" expectation.

For example if a song is heard on the radio, consumers now have many methods to be able to purchase that content through an on-line store such as iTunes and the like, whereas in the past the media was purchased through retail outlets on CD's and other physical media. Advantageously the ideas in this invention allow consumers to be presented with messages, adverts, content, monetary, and other vouchers to which they can immediately respond by viewing, saving, purchasing, or simply registering an interest in response to the message.

Consumers inherently watch or listen to programs that are of interest to them. It is reasonable then to assume that subject matter that is related to the content of the program will also be of interest to them. It is this concept that allows the present invention to significantly improve the user experience when viewing or listening to programs. With this invention, a source multi-media content provider can offer content and services directly associated to the program and content and services that are related in some way to the topic or genre of the program, which are therefore suspected to be of interest to the consumer.

Currently adverts presented during programs are often not directly related to the program content and as such may be of no interest to the viewer. However, the user experience can be significantly improved when a consumer has access to this invention. This can be illustrated in a number of examples below.

A viewer has selected to watch a documentary on the National Geographic channel. It is live TV, so there is no mechanism to fast forward adverts. It is about the animals in the Amazon rainforest and the effects due to habitat destruction. During this program adverts may appear for products such as nappies, soft drink or the latest sports car. With this invention however, the TV network offers supplementary content related to rainforests in general and also content on ways to reduce our footprint on the planet. For example, as the program begins, a message appears on the screen of the TV or remote control indicating that more information is available during the course of the program.

After ten minutes of viewing an advert for the latest sports car comes on, a message appears on the remote showing the Manufacturer's logo and an additional information icon appears on the screen of the viewer's remote control. The additional information icon directs the viewer to links for the current sponsors of the program, such as the nappy supplier, car manufacturer's internet website home page, and a soft drink offer. Additionally though, links to websites on the Tasmanian rainforests and hybrid cars are also shown. The viewer presses the mute button the remote control to mute the sound during the adverts. At that instant, a series of slogans from the car manufacturer are overlayed on the screen of the TV to assist the message intent during the muted state.

While the adverts are playing the viewer briefly looks at the Tasmanian rainforest link. It is of interest so the viewer elects to save this link for more detailed investigation at a later time. The adverts finish and the viewer continues to watch the program as normal. At the end of the program, another message appears on the remote control allowing the viewer to order a DVD of the program just watched or to donate money to the "Save the Amazon" fund. The user elects to donate $2.00 using an on-line payment system implemented on the remote control, such as PayPal or a stored credit system provided by the handset service provider. The viewer finishes watching TV and decides to explore in more detail the content of the Tasmanian rainforest website saved earlier.

By way of another example, a TV station may be broadcasting a musical concert being performed by a popular artist. At the end of each song during the broadcast, a message appears on the screen of the remote allowing the user to purchase and download that song. There are three versions of the artist's current number 1 hit. The user selects the extended live version and follows the links to purchase that song. The track is retrieved from the sponsor's server, paid for, and downloaded directly to the remote control or a link is sent by email to the user so that they can download it later on.

Another example is provided where an advert for fast food comes on the TV. It is 6.00 PM and due to the time positioning of the advert, it coincides when many viewers are thinking of what they might eat for their evening meal. Simultaneously an icon appears on the screen of the remote control and displays the fast food company's logo. The viewer touches the logo and it becomes apparent to the viewer that a redeemable token/voucher can be used. If this token/voucher number is presented at one of the fast food company's outlets in the next 24 hours, the customer will receive 10% off the bill. The viewer likes the offer and decides to go to the local outlet that evening.

Yet another example is provided where a listener is listening to a radio station. During each song or program segment a "buy song" icon appears on the display of the mobile device. The listener hears a song that is of interest and presses the icon. This allows the listener to purchase the song currently playing or to select from a list of previously played songs, or related songs. There are three versions of the currently playing song available so the listener chooses the original studio version and the song is downloaded to the handset. During the listening experience an advert comes on the radio for a local health food outlet. An icon appears on the screen of the remote control and the listener touches an "accept voucher" option. Accordingly the voucher is saved in a "MyVouchers" folder on the remote control and adds to any other vouchers that the user has previously chosen to accept. The listener can now conveniently redeem the voucher offer when next visiting the food outlet.

Therefore, while in the past the remote control has enabled that single "touch button" to effectively fast forward, mute or skip advertisements, this is in fact the driver for this invention which will change the nature of advertising on commercial television and radio and allow different and more engaging viewing patterns for consumers.

Hence while it may be that new technology is effectively reducing the effectiveness of free-to-air media advertising by simply hitting a button on a PVR or STB and so forth to skip ads or have them deleted, this arrangement provides for something totally different and new.

Advantageously every time the viewer touches the remote control to manipulate the program on a viewing screen or radio speaker, they can also be generating the display of additional multi-media content such as sound, pictures and textual information to the remote control.

In preference, the remote control would further include wireless communication, logic and an electronic storage capacity so as to transmit and receive information from an external third party server, the transmission of information could include the time, place and broadcasting details of the viewer in possession of the remote control which then under analysis from the remote server would then transmit across the media stream of sound, pictures and additional data applicable to at a particular time, place and content currently being viewed.

As the remote control may be in continual wireless communication with a server or the like, recognition of the time, the place and the media content can be analysed and so therein transfer to the remote control a correlated information stream made up of sound and pictures and the like and additional data that could provide highly targeted content next time the user operates one of the functionality keys on the remote control to affect the programme content being consumed.

Advantageously in real time, recognition of the time, place and context of the consumer is taken into consideration by this means of presenting advertisement installments and so forth.

In some embodiments the user when purchasing the device could provide information about his or herself so that information to be exchanged between the controller and the server could be associated with the demographics of the user and other provided characteristics.

As a person skilled in the art will advise, under existing technology if one was to simply replay a recorded programme with the tendency of fast forwarding or skipping through commercials, these commercials in any event may not be so suitable for the viewer at the time the recorded program is consumed.

For example, if a programme was originally broadcasted in the afternoon, the advertisers would have been interested in presenting items appropriate for that time such as nappies, cleaning products, cosmetics, food and beverage and the like whereas if the replayed programmed was time shifted to late evening it may be more appropriate for more adult oriented products and services to be presented during the viewing of the programme at that time.

Hence, late at night when the viewer is sitting back making use of the time shifting feature, and is simply able to press a particular button to delete or fastforward through commercials during the broadcast of the recorded programme, at the same time his/her remote control is exchanging information with an external server which is then communicating back at that moment of time when the viewer presses a button of the remote control to present on the screen of the remote control a message, advertisement, community announcement or other information which may be correlated with the programme content or demographic of the consumer or other criteria.

For service providers like TiVo and so forth whose slogan is "touch of a button" to remove television commercials or fast forward thereto, advantageously the opposite effect will be provided for with this particular arrangement wherein "a touch of a button" whether it be fast forward, skip, rewind or so forth will see the deletion of commercials from the television screen but substitution thereof, of what may be a more limited or a different message illuminated and displayed upon the screen of the remote control.

In a further form of the invention although this need not be the only nor indeed the broadest form of the invention, the remote control would preferably also provide the user with the ability to interact with the programme being viewed or listened to. In essence it will allow interactivity with a programme whether it is broadcast live or being played back from storage media such as a STB, PVR, DVD or CD.

For example, the content provider of the programme being viewed can request the viewer for a response and this may include content such as survey responses, game controls and interaction with a DVD, alternative movie endings, games and so forth as well as marketing material, preferably such as call to action campaigns, advertisement feedback, reality TV voting, responses and so forth as well as to facilitate impulse product purchases, all purchasable via on-line stores and the like.

Additionally responses to surveys, TV reality voting, etc can be made anonymously at the discretion of the user directly from the remote control without effecting or displaying such data on the main viewing screen of the TV or the like.

Advantageously this two-way information exchange between the programme being viewed with the viewer can compliment the features of the remote control, as discussed above, with respect to presenting advertisement installments, additional information and so forth.

Additionally the user experience is enhanced by the ability to provide messages and information to the screen of the remote control that would ordinarily be presented on the screen of the TV or projection device.

Although not the only embodiment of this invention it is advantageous for the messages to appear on the display of the remote control rather than the TV or other viewing screen as the information presented does not disrupt or affect the viewing experience of other viewers.

This concept is particularly advantageous where the EPG is being displayed on the remote control rather than the main viewing screen as the currently viewed program needs to be interrupted to view the EPG. In the case where the EPG is being displayed on the screen of the remote control, the user has the benefit of browsing the guide, reading additional information on programs, and making recording selections without the time pressures imposed when a number of viewers desire to continue to watch the current program.

Such data as EPG could be obtained through the retransmission to the remote control from the media device of the source broadcast data available with existing content delivery devices such as DVB and DAB, or in fact could be accessed by the remote control independently of other devices directly from an external server using a wireless connection to the internet for example.

The detailed interaction and exchange of information between the remote control device and the external server could provide greater detail in the information being transmitted and received between the respective entities such that it will enable greater customisation of the content delivered to the viewer. For example, a national advertising campaign could be delivered relative to programme or time slot criteria or localised content for small businesses could be delivered to consumers in certain postcodes.

This embodiment could also be further developed to include scenarios such as when a user of the remote control leaves home with it and enters a retail store in effect using it as a mobile information device. The device then interacts wirelessly with the store. Given the user has entered this particular store the information being downloaded to the device could relate for example to the local shopping precinct or the particular store.

The downloaded information may relate to future specials, points of interest, discounts and so fourth that maybe of relevance to the user. The information is not necessarily relevant on the day the user has entered the store, but the store wants to take the opportunity of downloading information to the user through the device so that at some future point in time the information can be presented to the user.

Advantageously regardless of whether or not at this future time or location, the user is on-line or in wireless communication with the store, as the information has already been downloaded when the user visited the store some time back, at that designated time, location or other trigger decided upon by the provider and included as part of the original download, the information resting in the memory of the device, accordingly presents itself.

Hence the store has been able to provide a new message to the user at a new time or location. This is regardless of the fact that the user is no longer in electronic communication with the store. Or in fact even within proximity of, or connected to a wireless network, or have access to an external database.

Additionally the information may be presented to the user upon the action of a trigger condition being fulfilled outside the aforementioned time and place conditions. Such trigger conditions may be simple or complex being formed from a series of logical or algorithmic combinations of events that could provide for very sophisticated targeting of information.

Such triggers may be as a result of all kinds of conditions becoming true. These could include, but are not limited to user context, in response to user input including but not limited to an enquiry, triggers received from external systems and voice activated instructions, or due to entering or exiting geographic regions, LAN, PAN, or WAN network identifiers being detected, postcode entry, toll gate triggers, RFID or proximity triggers and others.

Trigger events may be generated as a result of user input or enquiry, for example a user wishes to find a particular kind of store close to home, they may enter, or already have previously stored in the mobile device, a postcode, or zip code. By using a service such as a telephone directory or other local services directory, upon a user entering or refining a search on a product, a trigger may initiate a participating vendor to present to the viewer a message, icon or some other visual or audible alert that draws the attention of the viewer to their particular establishment.

Another mechanism for generating trigger events is via the reception of data from a digital media broadcast such as DVB, DAB, FM RDS or the like.

Other triggers may be gained from data or events carried on non broadcast networks such as wireless LAN, PAN, or Wide Area Networks.

Yet other trigger events could be received from information contained within SMS messages, instant messaging services, emails, and the like.

In addition to using broadcast media to carry triggers as previously described, broadcast mediums such as FM RDS can additionally be used to carry data which could include icons, bit maps, audio files, or in fact even executable files. A person skilled in the art will recognise this mechanism is poorly equipped to send large amounts of data, it remains however to be a potentially useful channel for broadcasting small amounts of data to a large population of devices which for the purposes of this invention becomes very advantageous to content providers as the end user need not be on an internet connection or have access to hotspots or other wireless networks. Even more advantageously, the penetrating capabilities of FM signals, provides for a particularly wide and continuous reception area even in the traditionally difficult reception areas of dense city centres or mountainous terrains. The data can then be presented to the user or utilised in some other way when received or simply reside in memory waiting activation by a future trigger event.

Another embodiment of this invention provides for a particularly useful service, herein referred to as "Local Services". The concept of Local Services is that a collection of content or service providers publish promotional data that is accessible to the user through a web site. In addition to the standard groupings of product or service types one of the mandatory data entries will be the geographic location of that product or service. It is this location data combined with the location of the user that drives the responses and the presentation of data to the user. The location of the user can be determined in preference by the user entering their post code or zip code upon initial registration with Local Services or when the mobile device is initially purchased. This pre initialisation removes the requirement for the user to repeatedly enter geographic data each time Local Services is used. It is beneficial, however to allow the option for the user to re-enter geographic data in case the mobile device is being used outside of its usual location. Additionally, the Local Services client can take data from external trigger events derived from geographic data, such as those mentioned earlier including GPS data, geo-fence boundaries, LAN, PAN, or Wide Area Network identifiers, etc. and use this data to override the default registered geographic data.

Using Local Services, the user can search for a service of interest, such as restaurants and trades people and have presented a listing of those services that are located in close proximity. Additionally the presented listing could be modified to represent the data in a more useful way to the user based on historical selections, user preferences, etc. For example if the user has a preference to visit or order fast food, then those establishments may appear higher in the results listings whereas five star restaurants could be placed lower on the list.

The historical monitoring of the user is preferably provided by the mobile device using the processor and memory to store such use, but the storage of such information may be achieved using external storage and the communications mechanisms used as required to store and retrieve relevant data.

Additionally the results listings will be modified or influenced using the trigger mechanisms described earlier.

Additionally by having a system of bidding, where content and service providers pay additional fees to the provider of the Local Services facility, those listings associated with the highest bids will be positioned higher in the listings presented to the user in the hope of gaining more favourable commercial outcomes.

A further embodiment of this invention allows an environment where multiple users can be equipped with their own personal remote control or mobile device.

This multi controller environment allows for a new level of intimacy between the interaction of content providers and consumers, where not only can content be customised and presented in a way to benefit a household, but in fact can be optimised for individual consumer within that household using the screen of the remote control.

Advantageously it can be imagined a situation where multiple members of the household can individually and independently partake in user surveys, response to polls, interact with TV game shows, etc, all the while receiving additional content and information that has been personalised for that user's preferences, historical responses or buying habits.

A yet further embodiment of this invention allows the remote control to be equipped with a camera and microphone. In this case the remote control can run a messaging client allowing chat, SMS, Voice Over Internet Protocol and Video VOIP functionality to communicate with other users or directly with the service or content providers.

It is foreseeable therefore that a user, upon taking an interest in a product or service provided by a vendor, could register or connect to that vendor and setup further communication allowing a direct link between the parties. This is potentially advantageous to both parties as the user can ask questions or receive additional information directly from the vendor without the need to make a phone call or go to an internet connected PC, but instead by having access to these facilities directly on the remote control.

It will also become apparent that this invention can provide significant benefits to arrangements where the devices typically do not have a display on which content is viewed, for example digital radio receivers where content is presented primarily by audible means.

A remote control equipped with Auto Discovery Remote Control (ADRC) technology enables suitably equipped devices to establish a wireless communication link to transfer control data and other wireless media between the device and an ADRC remote control. However, even in devices that are natively without ADRC, if such devices are able to connect to an accessory that provides a wireless communication mechanism compatible with ADRC and receive suitable software, then significant advantages can still be realised for content providers, broadcasters and consumers alike with such legacy devices.

When an ADRC equipped mobile device is in communication with a digital radio receiver, over a wireless communication mechanism such as Bluetooth, ZigBee, or the like, additional multi-media data associated with the source multimedia content of the radio broadcast can be presented on the display of the mobile device. This allows for a completely new visual mechanism for radio broadcasters to present additional multi-media data in the form of for example messages to listeners.

It is currently popular for radio stations to present podcasts to viewers via the internet and they may contain audio only or a combination of audio and video. The consumer is required to connect to the internet and download the content for consumption. In this arrangement a suitably equipped mobile device is used as a visual extension to the radio and provides a mechanism to present to the consumer visual content in a way that has not been possible previously.

In cases where the radio broadcast bandwidth is insufficient to directly carry image or video data, other information such as a URL can be sent, to facilitate the connection of a suitably equipped mobile device to a server provided for the broadcaster, thus allowing an alternate high bandwidth connection to be made so that content synchronised and correlated with the main broadcast programme can be delivered to the mobile device.

In this way, radio broadcasters can now provide services that are more akin to TV broadcasters and accessing all the associated benefits resulting from this.

By utilising the data channels available within digital radio broadcasts, information and associated trigger signals and data can be processed by the radio receiver and subsequently made available to a suitably equipped mobile device by way of a wireless communication mechanism.

As an example, a user may be listening to the radio in the comfort of a lounge chair and when each new song is played, a trigger emanating from the radio and received by a suitably equipped mobile device causes an icon to be presented on the screen of the mobile device allowing the user to immediately access detail of that song and ultimately purchase it should they so desire.

The request for purchase can be processed by a server operated by the radio station or a third party. The content being downloaded and in this case purchased, can also be sourced from this server, or the content request directed to the many content delivery services that exist, such as iTunes and the like that will allow access to that content. In either implementation, there now exists a mechanism for broadcasters to become effectively distributors of content.

Thus, typically where a consumer was required to personally go to a retail outlet to purchase, say a CD or video, or more recently where they have the ability to purchase on-line via a web store where they would be required to turn on a computer, log-on, search for the song, then download it, this invention provides a simpler and much more convenient mechanism to make purchases. Thus for a consumer enjoying this arrangement where upon hearing a song or seeing a video clip delivered by a broadcaster, the consumer by way of a suitably equipped mobile device is presented with an opportunity to respond with the touch of a button to a "buy it now" offer and have that content delivered immediately to the mobile device or to some other place.

As previously introduced, this mechanism also supports the display of vouchers, public service announcements, logos, links to related content, etc to be made available to the consumer even when the broadcast medium is radio.

As a further example of the advantages that this arrangement provides, when a consumer is listening to a sporting event on the radio, they may not always be within audible vicinity of it due to other tasks they may be performing, thus score announcements and other useful information may, from time to time be missed. However, with this arrangement, provided a suitably equipped mobile device is within wireless communication range of the radio, the scores or other data can be sent and presented on the screen of the mobile device, ensuring the consumer is always kept up to date with the progress of the game.

Similarly advertising logos, slogans or offers can dwell on the screen of the mobile device even after the real-time advert or announcement has finished on the radio broadcast. Thus a more advantageous and lasting mechanism is provided for many broadcast media systems.

The ability for messages to dwell on the screen of the mobile device presents additional opportunities for content providers wishing to present their message to the consumer, particularly for commercial gain, whereas in the normal course of events with the current state of the art, the message due to its real-time delivery nature, has come and gone.

The preceding few examples show that this invention clearly advances the state of the art by providing an improved arrangement and method which allows for the provision of highly customised and personalised information between content providers and groups or individuals engaged in the consumption of broadcast media content and additionally allowing interactivity between these consumers and content providers.

This embodiment of the invention relates to the ability for the content providers to be able to service the very large data volumes that will be generated due to many consumers simultaneously accessing the same broadcast source content due to synchronized event triggering.

While to a viewer it may be particularly advantageous to sit back, watch or listen to a broadcast and be able to respond to and download content of interest, a new problem is created for the content provider. If a program is expected to have a large viewing audience such as a major sporting event or musical concert, then it is expected that a large number of consumers may simultaneously download content from the servers via the interne. The problem currently exists where popular services are provided such as iTunes, movie sites, and the like. In these cases large data capacities need to be provided for the servers holding the content so as to provide sufficient data bandwidth to give acceptable download speeds to the end user. With captive TV audiences watching or accessing the same program, extraordinarily large numbers of users will potentially download data at virtually the same time. Particularly in the event that in a multi controller environment, where several members of a household may be in possession of a remote control or other suitably equipped mobile device, all of which have the ability to download the same content. The number of users of the system is not simply restricted to the number of households on line. The cost to the service providers to provide such large data pipes may be prohibitive, or not even possible in certain countries or regions due to poor communications infrastructure.

One solution to the problem of coping with large data capacities is for the additional multi-media content distribution system to use existing peer-to-peer networking technologies. As a person skilled in the art would be aware, the peer to peer concept shares the processing power and storage capacity of many inter-networked computers that may be spread all over the world and even whilst these computers are performing unrelated tasks.

While it is possible to use peer-to-peer networking wherein a mobile device acts as a node in communication with other nodes to which it is regularly advertising capabilities and needs, the peer-to-peer protocol itself relies on the node, such as the mobile device, being able to both transmit and receive data from its peers.

Hence if a mobile phone is presenting itself in the peer to peer networking arrangement as a node providing resources available for sharing and a network address for direct connection across a network or the internet to exchange files or process applications, problems will soon arise as a person skilled in the art will appreciate a mobile phone wireless connection is very asymmetrical, being heavily weighted for downloading rather than the uploading of information to the peer to peer networking system.

Consequently with such asymmetrical configurations with very low uploading connection speeds and uptake to the network, for the most part, mobile phones are ineffective as a device as a direct connection across a network or the internet to exchange files and/or process applications.

Also from a commercial point of view if the mobile phone acts as one of the nodes which is advertising its capabilities and needs in exchange for files or process applications upon a peer to peer networking arrangement means that conversely without the user even knowing in many instances that particular node, that being the mobile phone, will be sharing its processing power, storage capacity to the network, thereby taking up or clogging up expensive bandwidth and battery energy which could be used more effectively, efficiently or commercially in the exchange of other data else where for another user.

At present many telecommunication companies provide their mobile phone users with unlimited access to the internet and the problem being then if such users on such plans from the telecommunication company then subject their phone to act as a node as part of a peer to peer network, means that given they have unlimited access, their phone in a sense acts as an uninterrupted source or place for continual processing power, storage capacity and the like for the exchange of files or processes between other nodes that are connected to the peer to peer network.

As is to be expected this is not a good way for telecommunication companies to make a commercial return from the bandwidth available to them which is provided to their members of the purchasing public, so in order to overcome this problem in many instances telecommunication companies have blocked the use of peer to peer protocol packets with the mobile phones they provide making data processes with peer to peer protocols impossible.

Consequently therefore there remains a requirement that allows for the speed advantages of peer-to-peer networking or protocol to be experienced on a mobile device while maintaining encryption security of the data being transferred but ultimately not using a peer to peer communication protocol between the mobile phone and the final source location to which the exchanged file or process application is being downloaded from.

Accordingly in one form of the invention although this need not be the only nor indeed the broadest form of the invention there is provided an arrangement for a user of a mobile device to allow said user the experience to enable viewing comparable or better, to which one would expect from peer to peer networking communications protocols, without such peer to peer networking being used in the final exchange between the mobile device and the source files to which the final download of the image, files and/or applications are being taken from.

Where a mobile device such as a remote control or mobile phone are connected wirelessly to a PC or other computing device connected to the internet running custom software wherein the connected PC to the internet runs a peer to peer protocol that begins gathering the additional multi-media data for the file, image and/or protocol application exchange such that once the first packets are received the data contents of said packets are encrypted and wrapped up into a popular streaming media protocol (such as Flash Player 9) and streamed over a wireless interconnection to the hand held device equipped with the media player with security decryption whereby once the packets arrive they are decrypted and may be viewed in real time immediately.

Advantageously the fundamental difference between streaming video in real time from a peer to peer network back end is that the delay between the video request and video viewing can be greatly reduced. Advantageously such an arrangement makes pay per view video from a mobile device a commercial reality as a server provider can set up a relatively simple and inexpensive video streaming server. Without this system a provider needs to set up a very large networking arrangement, such as very high data rate internet connections into a server to handle the large number of simultaneous downloads that occur for point to point transfer as opposed to the peer to peer transfers able to utilise the processing power and storage capacity of network computers which form part of the network group.

Advantageously the viewer watching the images on the mobile device is able to receive the data experiences at much faster access speeds, resulting in less video pauses during the viewing. Still further, encryption of the data fulfils the requirements of the media provided to prevent copying of the data.

A detailed description of embodiments of the invention using the figures is described.

FIG. 1 shows how broadcast or streamed content may logically be represented as a sequence of data. The program content 23, known as the source multi-media data, begins at a start time 15 and then finishes some time later 16. The program is typically broken up into viewing segments, separated by adverts or announcements, represented by 13 and 14, Multi-media content generally has some header or metadata preceding the program, represented by 11. The program start time can be selected by the viewer if it is a pre-recorded program, whereas if it is viewed live, the start time is fixed and not user selectable. This figure schematically illustrates a logical representation of a single channel of, non-optioned program content. It is this content that is referred to as source multi-media data and is the data stream that the user is tuned to in order to view or listen to the program 23.

Even in digital TV or radio configurations that can broadcast multiple channels simultaneously, the user has selected a single channel and as such, is the recipient of only that channel of source multi-media being broadcast. During the time of the broadcast program, a number of adverts or announcements are inserted into the program at the time of or prior to, the time of broadcast, however from the perspective of the user, they become part of the serially transmitted program as there are no alternative options for them to select from.

Figure 2:
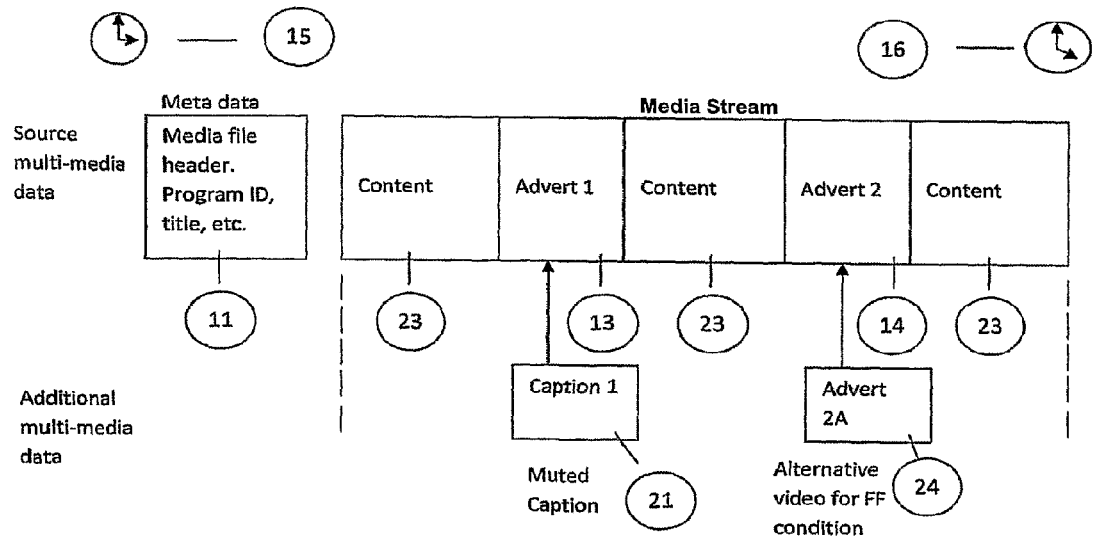
FIG. 2 shows schematically an example of how additional multi-media data can be present during the time that the source multi-media data is present.

FIG. 2 shows the same content 23, being the content source multi-media data, as in FIG. 1, with additional multi-media data being present, namely Caption 1 represented by 21 and Advert 2A being represented by 24. In this situation, even though the consumer is tuned to the channel containing the source multi-media data, content 23, additional multi-media data 21 and 24 are also broadcast or made available via other mediums and available at certain times throughout the duration of content 23.

Figure 3:
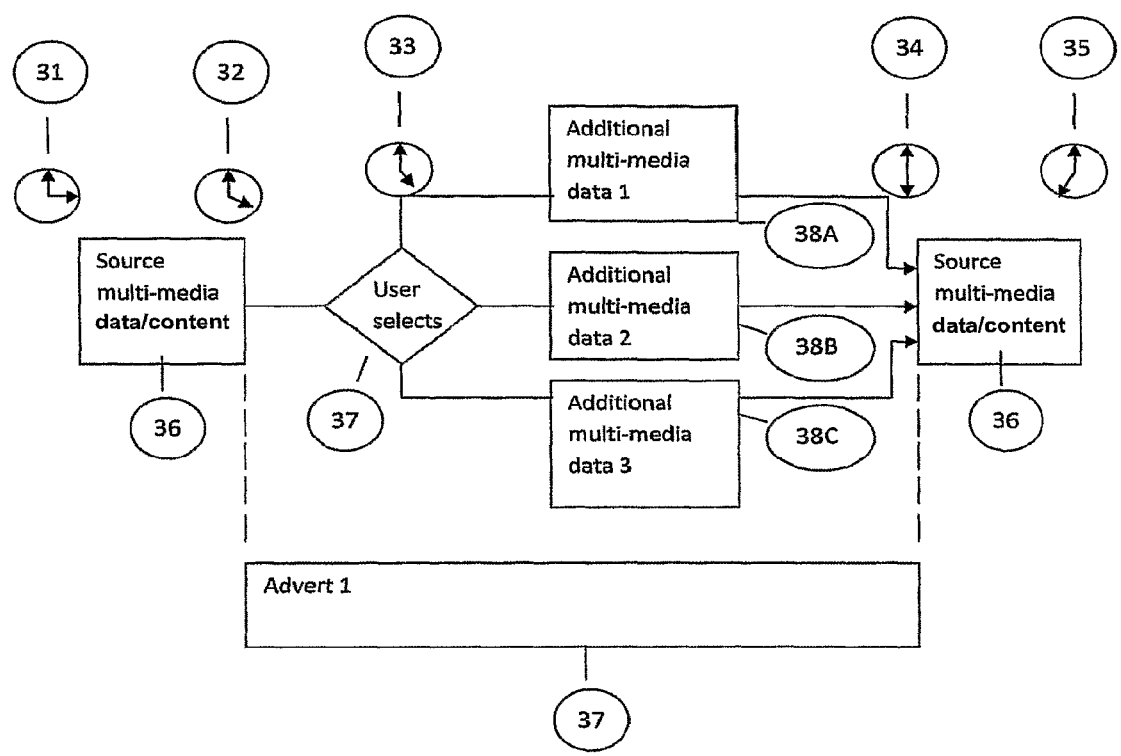
FIG. 3 shows schematically how a number of additional multi-media data options can be user selected during the time source multi-media data is accessible.

FIG. 3 represents that at some time the program content 36 begins at time 31. At some time 32 into the program content 36, an advert 37 begins. At later time 33, the user decides to select and view one of the alternative additional multi-media data available represented by 38A, 38B and 38C. At time 34 the advert 37 finishes and the program 36 resumes and then ends at time 35.

Figure 4A:
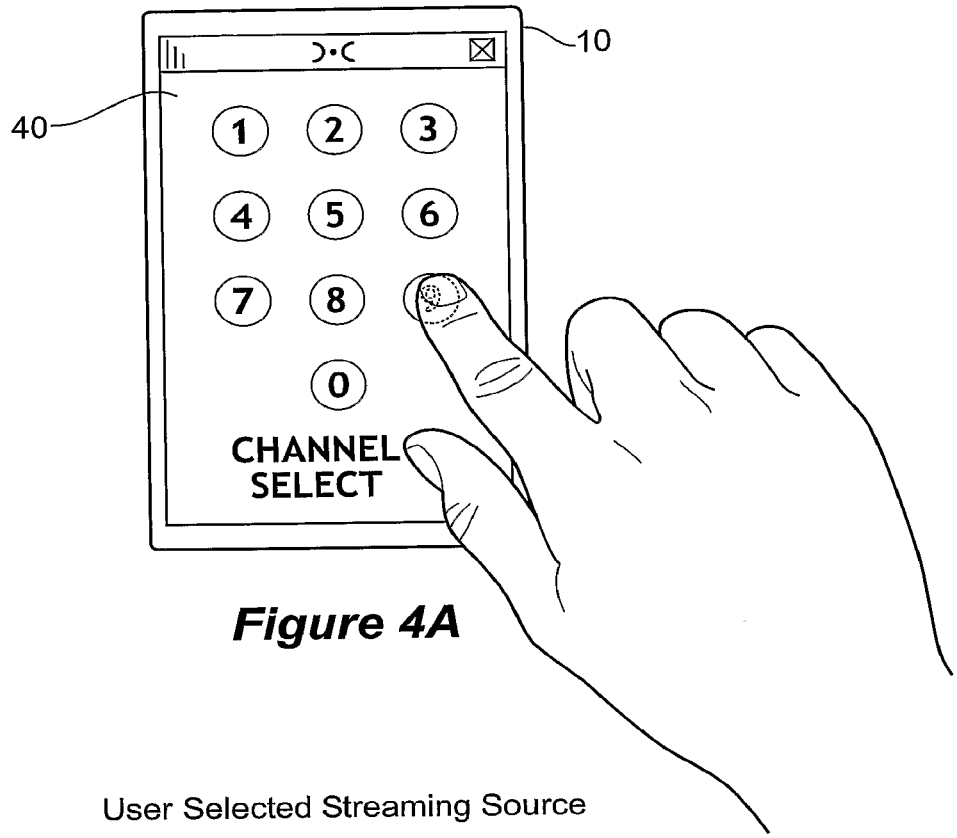
FIG. 4a shows a user selecting a TV channel using the mobile device.

FIG. 4a shows the user 12 selecting a channel on screen 40 of mobile device 10.

Figure 4B:
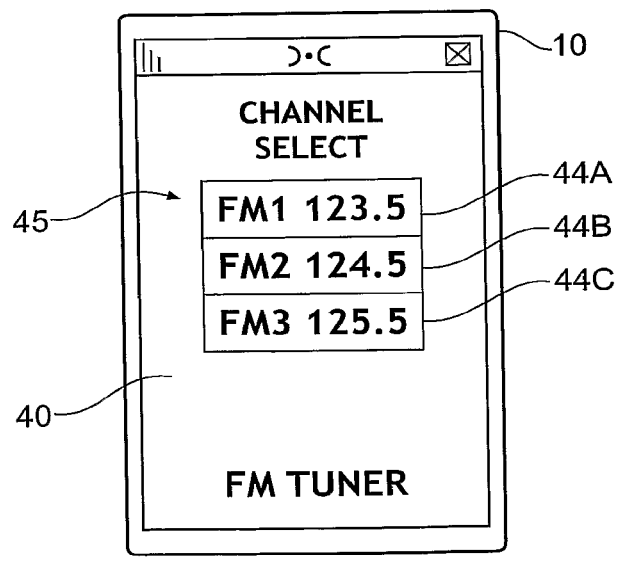
FIG. 4b shows a selected radio source on the mobile device.

FIG. 4b shows one of a number of radio station channels 44A, 44B, and 44C available for selection on the screen 40 of the mobile device 10. Currently channel 44A is selected as indicated by selector 45.

Figure 4C:
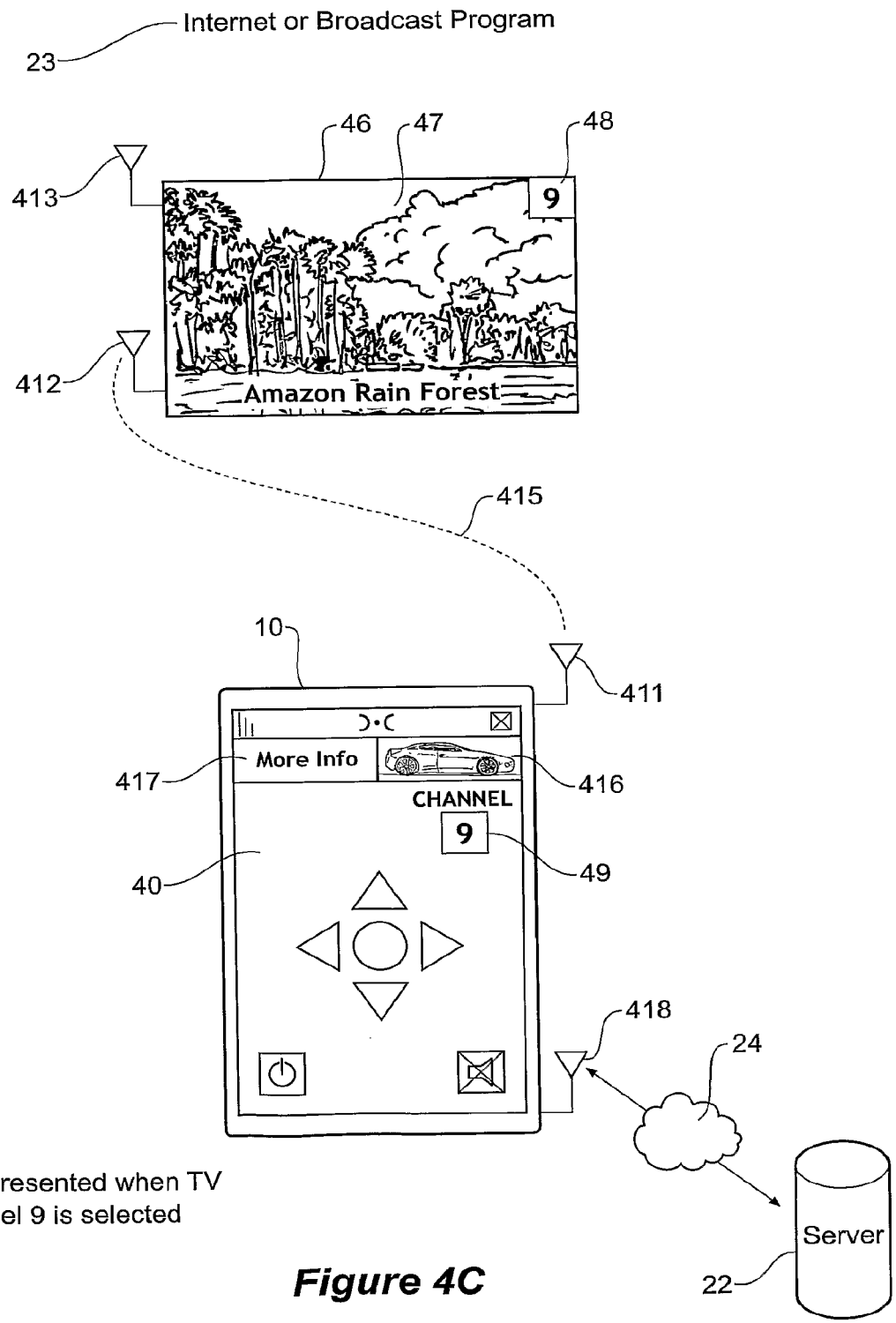
FIG. 4c shows the data present on the screen of the television set and the mobile device when TV channel 9 is selected.

FIG. 4c shows an arrangement of a TV 46, a mobile device 10 and a data server 22. A data server includes a digital data memory, a processor, and a communication mechanism, wherein the processor coordinates access to and delivery from the memory of digital data using the communication mechanism. The mobile device 10 has controlled the TV 46 to display the program 23 "Amazon rain forest" on the TV screen 47. Channel "9" has been selected as seen by indicator 49 on the screen 40 of the mobile device 10 and indicator 48 on the screen 47 of the TV 46. The program source 23 is being received by the TV 46 through input 413 which could represent an IP connection, RF antenna, AV input, etc. The mobile device has communicated the channel change command to the TV 46 using wireless communication mechanism 415 through antennas 411 and 412. This wireless mechanism may simply be an infra-red (IR) link. However it may also include additional wireless communication mechanisms such as a PAN. If a PAN exists with two way communication facilities, the TV could provide source multi-media data and/or additional multi-media data to the mobile device. Alternatively the additional multi-media data could be accessed by the mobile device 10 using the wireless communication mechanism 24 using antenna 418 to access the server 22. The additional multi-media data that the mobile accesses may be filtered modified or presented according to a user profile, historical patterns, etc.

The data sent to the mobile device 10 may or may not be presented immediately to the screen 40 of the mobile device 10. It may however reside in the memory of the mobile device 10 to be displayed at a later time. The conditions governing the triggering of when this information will be displayed and how it will be displayed can be determined by a set of trigger parameters.

Icon 416 shows an advert icon from a motor car company, which if activated by the user reveals further information. Also an icon 417 has been presented and if activated may reveal more information to the user about the program or sponsors of the program.

These icons 416 and 417 and associated data are made available to the mobile device 10 from an additional multi-media data source associated with the source multi-media data 23 the user has selected.

Figure 4D:
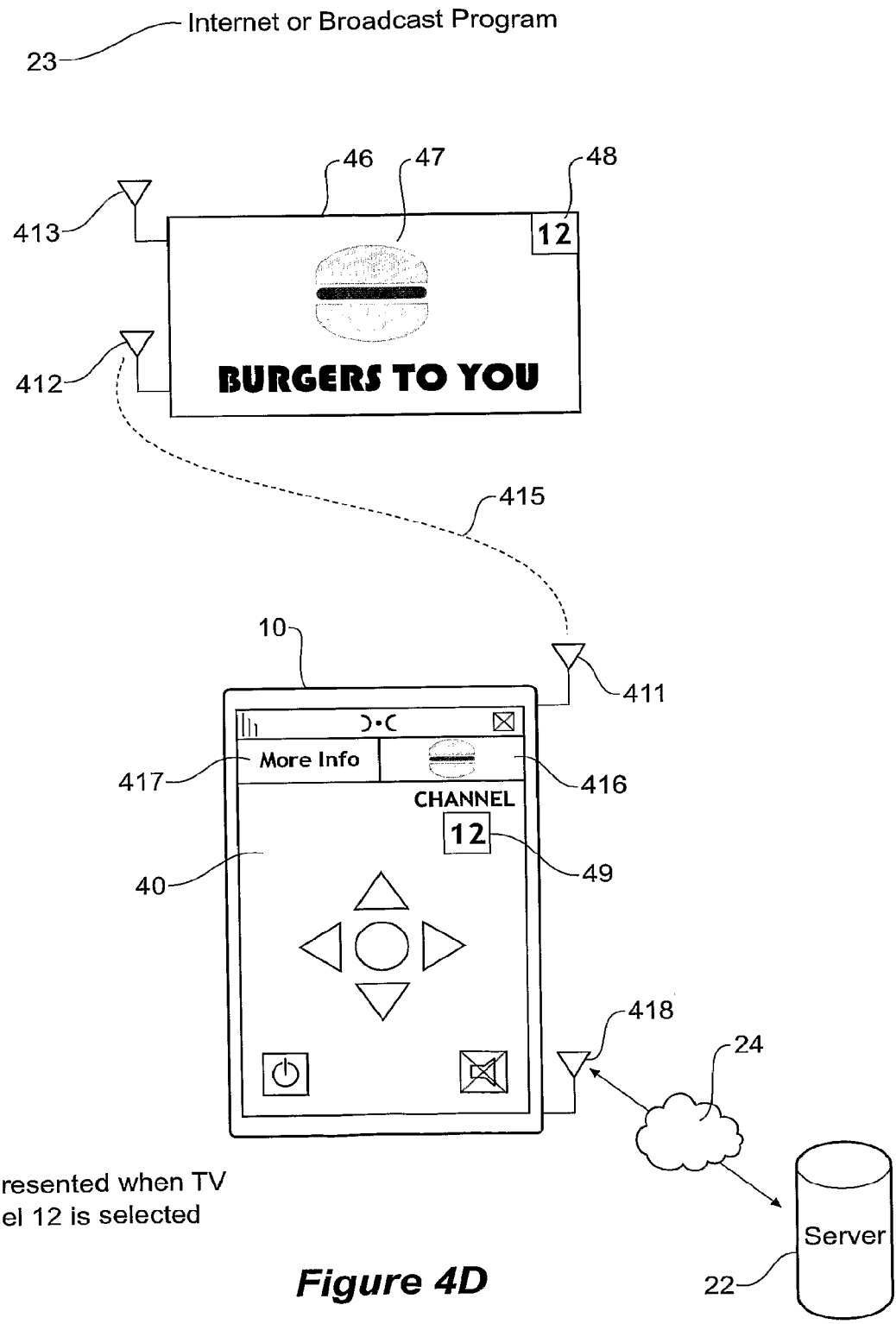
FIG. 4d shows the data present on the screen of the television set and the mobile device when TV channel 12 is selected.

FIG. 4d shows a similar arrangement to 4c. However the channel selection icon 49 on the mobile device and 48 on the TV shows that the user has selected channel 12. In this case, different data has automatically been presented on the display 40 of the mobile device 10 in the form of a new icon 416. In this case it is an icon that represents a burger company, that when activated may provide the user with a voucher or some other information on the company.

The concept being presented is that the additional multi-media data accessed by the mobile device has automatically changed to reflect the different TV channel being viewed, rather than being manually selected by the user. It may have been the TV that communicated the identification of the new channel or the identification of the program content to the mobile device, or the mobile device itself may have been able to determine the channel or program identity from the user's key press, or alternatively retrieved that data from an external source, such as a server 22. In the case where the TV 46 was replaced with a DVD player, the identity of the content on the DVD could be transmitted to the mobile using wireless network 415. This identity can then be used to access the appropriate additional multi-media data.

Figure 5:
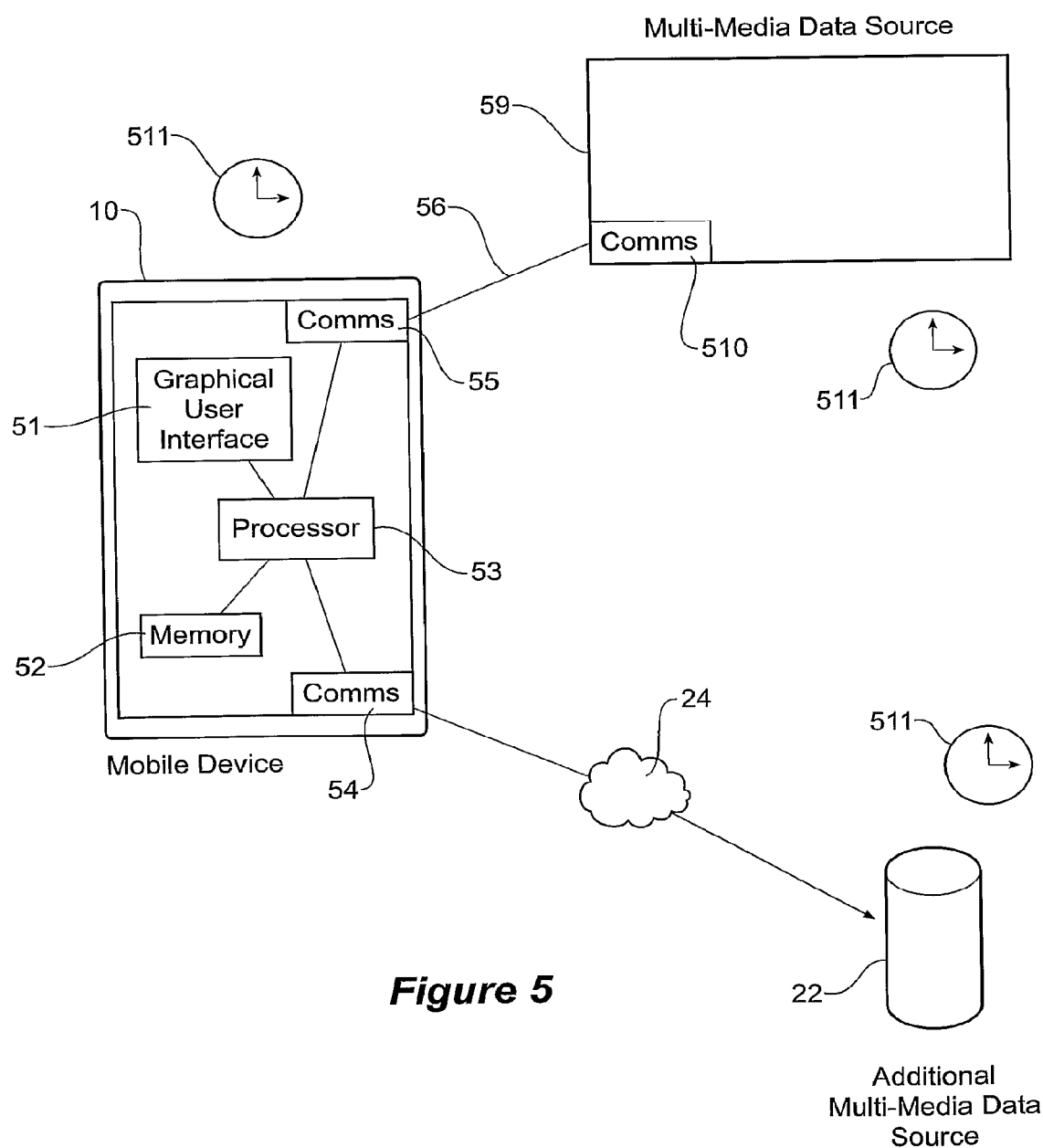
FIG. 5 shows schematically that the additional multi-media data is present during the time the source multi-media data is available and is communicated to the mobile device by communication channels.

FIG. 5 shows the source multi-media data source 59 and additional multi-media data source 22, being accessed by the mobile device 10 at the same time 511. The mobile device 10 can access the source multi-media data 59 through communication interface 55 and 510 and the additional multi-media data using communication interface 54 to access and communicate with the server 22. The processor 53 of the mobile device 10 processes the additional multi-media data and determines how it is to be handled. It may be presented immediately on the display/Graphical User Interface (GUI) of the mobile device 10 or alternatively could be stored in the memory 52 of the mobile device for processing at a later time. If it is displayed on the GUI, additional display parameters such as dwell times, user profiles, etc, can be used to determine how the information is displayed. If the data is stored in memory 52 it may have additional data or parameters stored also such as trigger events or user preferences to determine when and how the data is displayed on the GUI.

Figure 6:
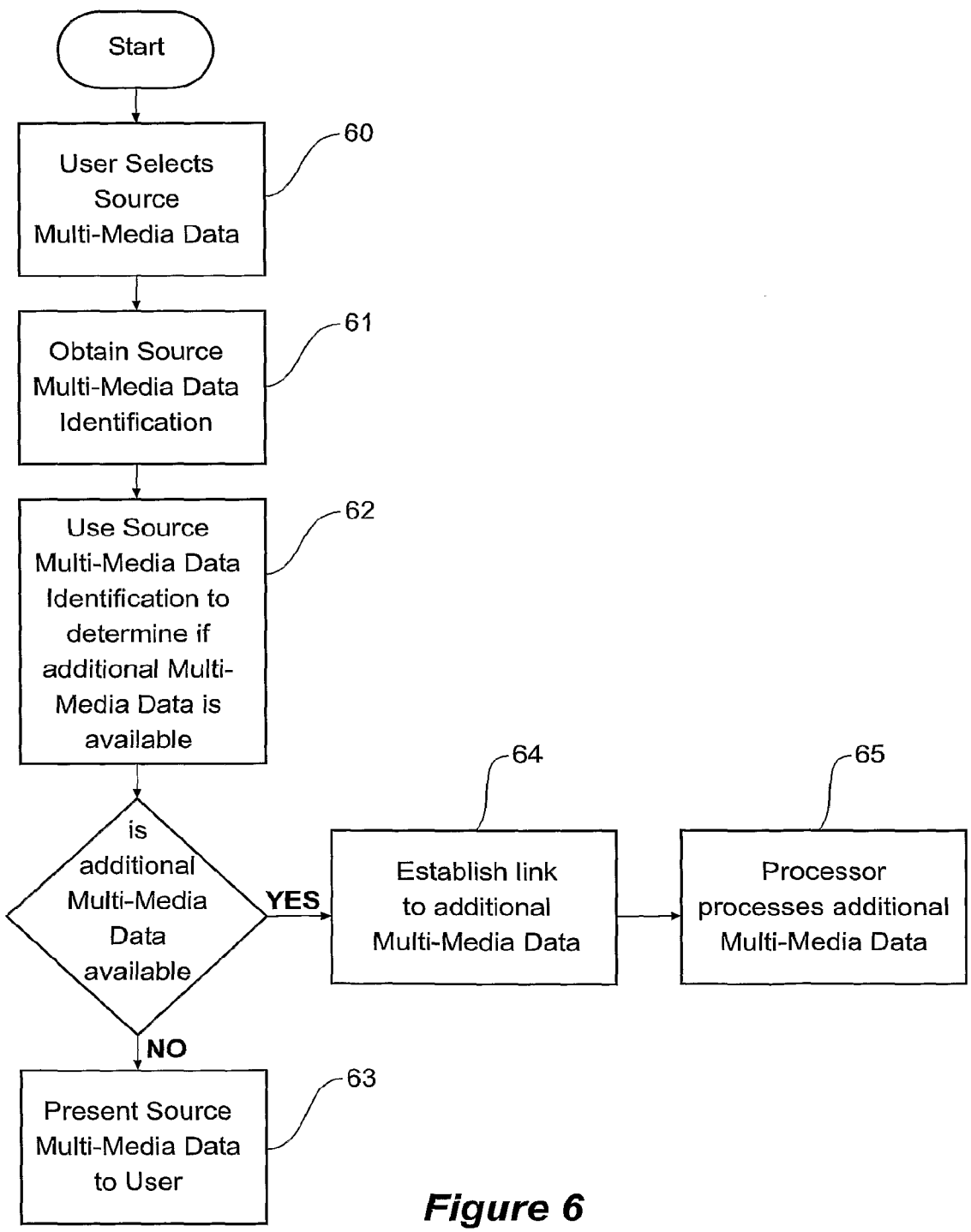
FIG. 6 shows a process flow diagram of a mobile device accessing the additional multi-media data.

FIG. 6 shows the process flow of a mobile device capable of receiving additional multi-media data. In step 60 the user selects the source multi-media data source. This may be a TV channel or radio station. In step 61 identification data is obtained for the selected source multi-media data. This may be obtained directly by way of input to the mobile device, such as a channel selection by the user, or it may be provided to the mobile device or external server directly from the source multi-media data or obtained from the playback device providing the source multi-media data. At step 62 this source media data identification is used to determine if additional multi-media data is available for processing by the mobile device. If no additional multi-media data is accessible or required to be processed at this time, the mobile device presents the source multi-media data to the user with no additional processing. At step 64 if additional multi-media data is available, one or more sources of that data are identified and data links to that data are established and at step 65 the processor of the mobile device processes that data as required.

Figure 7:
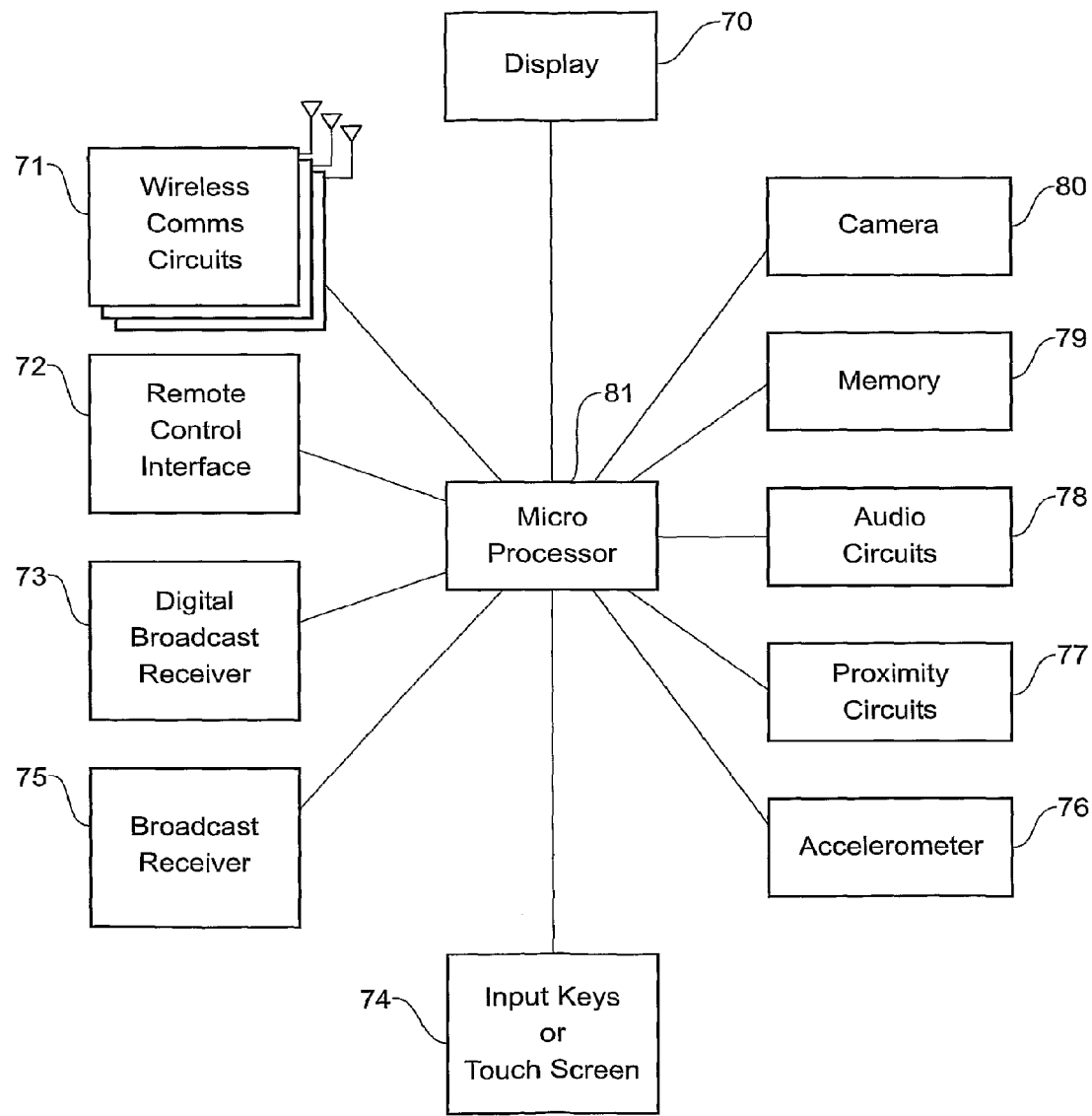
FIG. 7 represents the functional blocks forming a mobile device capable of receiving and processing source multi-media data and additional multi-media data.

FIG. 7 shows the block diagram representing the possible functional blocks within a mobile device capable of receiving source multi-media data and additional multi-media data. A mobile device may will at least include a processor 81, memory 79, a user interface mechanism (one or more of 72, 74, 76, 77, 78, and 80), one or more wireless communication mechanisms 71. The processor 81 communicates with or coordinates processes to all other function blocks. The display 70 is typically but not restricted to an LCD, LED or OLED display. One or more wireless communication mechanisms 71 are used to communicate with other devices and may also be a channel for additional multi-media data. A remote control interface 72 is available for selecting the source multi-media data. This may include one of the wireless communication mechanisms 71. This remote control interface 72 may provide an interface where external appliances or controllable devices are to be controlled such as a TV, radio, or it may be a mechanism for making a selection where the source multi-media data can be received directly on the mobile device. An optional broadcast receiver 75 may exist on the mobile to allow the user to receive broadcast multi-media. It may consist of FM receiver circuits, etc. An optional digital broadcast receiver 73 may exist on the mobile to allow the user to receive digital multi-media data content. It may consist of DVB receiver circuits, digital radio receiver, etc. An accelerometer or number of accelerometers 76 may be available to detect motion of the device. This may be particularly useful as inputs into trigger event algorithms. Optional proximity circuits 77 may be used to detect when the user is in the vicinity of the mobile device. Optional audio circuits 78 are available where audio is desirable to be presented to the user from multi-media sources or in the form of alert messages, etc. Memory 79 is available to the processor for programs, applications, data, and variable storage. Optional camera 80 may be used for user recognition to allow user preferences to be implemented when processing or presenting data. Optional input keys or a touch-screen 74 are provided for accepting input from the user.

Figure 8:
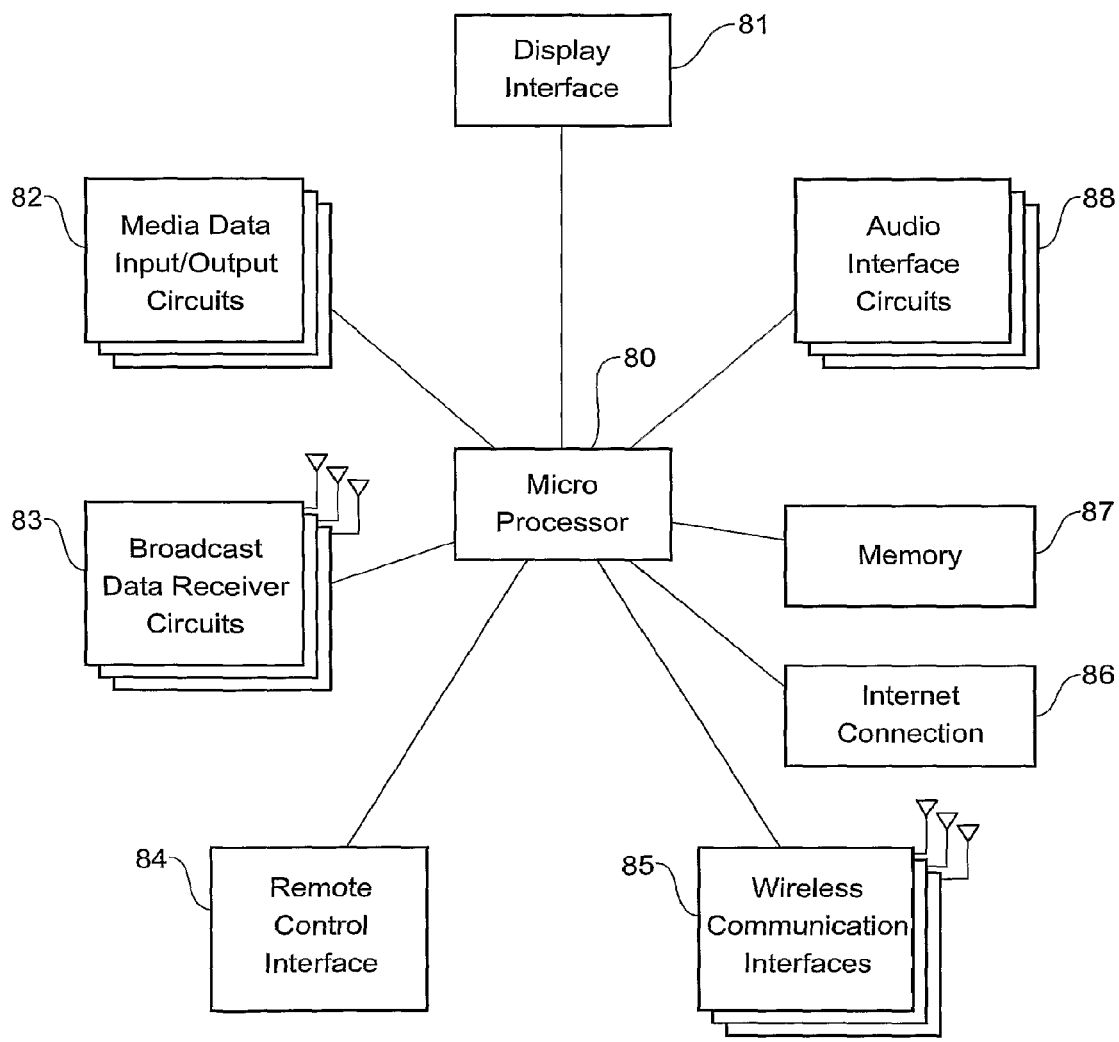
FIG. 8 represents the functional blocks of a device capable of providing source multi-media data, that being a TV, radio, set-top box, DVD player, PVR, etc.

FIG. 8 shows a block diagram that represents the possible functional blocks of a playback device capable of providing source multi-media data. The processor 80 communicates with or coordinates processes to all other function blocks. The display 81 is used to present multi-media data to the viewer. One or more multi-media data inputs/outputs 82 are used to connect external devices to the device. These input/output circuits could support RS232, Audio, Audio/Video data, HDMI, IP etc. One or more broadcast data receiver circuits 83 can exist to receive broadcast media such as FM, digital radio, Digital TV, etc. Remote control interface circuits 84 are for enabling the device to be remotely controlled using a mobile device, typically an infra-red or wireless remote control. One or more wireless communication interfaces 85 may be available for communicating with external devices. This may include interfaces such as ZigBee or Bluetooth PAN, Wi-Fi, LAN, UWB, etc. An optional internet connection 86 may be available for control or IP data streaming. Memory 87 is available to the processor for programs, applications, data, and variable storage. Audio interface 88 is used for transmitting or streaming audio directly from the device or via external devices such as sound processors, etc.

Figure 9:
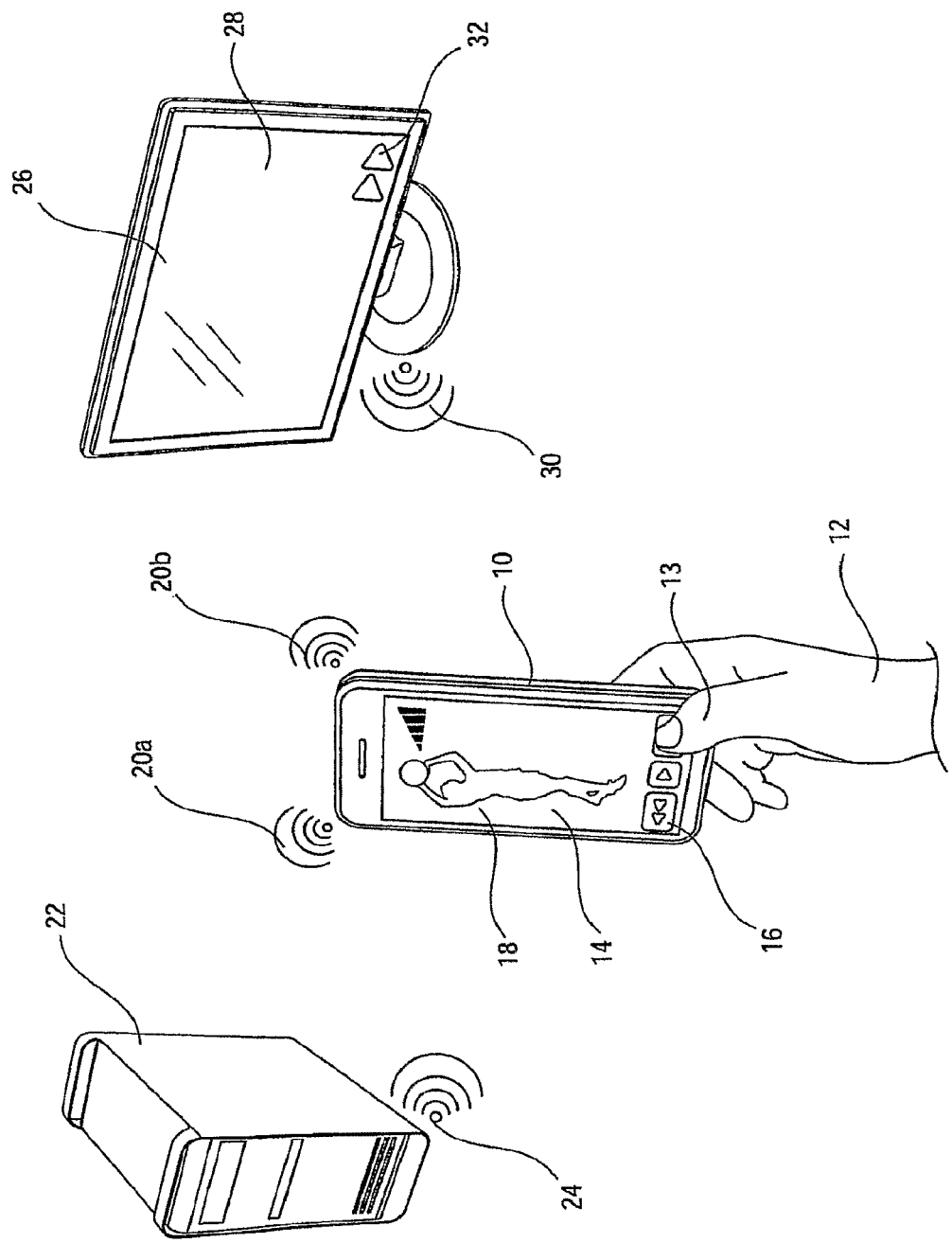
FIG. 9 is a systematic representation showing interaction of the mobile device in communication with an external server and also locally the television screen to which it controls.

Referring to FIG. 9 now in greater detail where there is provided a hand-held remote control device 10 which is being grasped in the hand at 12 of the user or viewer of the television 26.

Put in context this hand-held remote control device could just as easily be a mobile phone, cellular phone, cordless phone as well as any other telecommunication device.

This electronic device whether it be a stand alone remote control or a telephone or other suitably configured mobile device is able to carry out the required functionality of a traditional remote control, by way of as expected when operated to control the images being displayed upon the screen 28 of the television 26 or projector device.

In this embodiment the hand-held remote control device 10 is in communication with an external server 22 by some form of wireless communication represented by 24, 20a and/or 20b, wherein 20b is also the wireless communication between the hand-held remote control device 10 and the television set 26 via wireless communication 30.

When the user 12 presses one of the functionality keys 16 for example, the thumb 13 of the user 12 presses the fast forward functionality of the remote control 10 which is shown as 32 on the television set 26.

Hence while the user 12 is simply trying to fast forward, for example commercials being broadcast on the screen 28 of the television set 26, the moment they touches the remote control button to control the television at the same time the remote control device 10 is in communication with the central server 22 wherein a media stream of sound and pictures is then transmitted to the remote control device to be presented on the screen 14 as the relevant advertisement 18 and so forth.

As discussed above when the user purchases the mobile device, they could provide information about his or herself so that information to be exchanged could be directly relevant to the user.

A mobile device is described that if a viewer decides to time shift and watch a programme at their preferred time of the day and it is also their preference to skip through or delete commercials as they appear during the delayed replay of the broadcast, their interaction with the remote control device 10 will however provide an opportunity for a multi-media stream including sound and pictures that can make up a variety of different kinds of messages, information and advertisement to be presented upon the screen 14 of the remote control device 10.

The touching of any of the functionality pads, tabs, or pins of the remote control device 10 sees an immediate interaction between the remote control device 10 and the external server 22.

As discussed above when the user purchases the device and so forth, could fill out information about his or herself so that information to be exchanged could be associated with the demographics of the user.

A mobile device is described whereby if a viewer decides to time shift and watch a programme at their preferred time of the day and also in their preference to skip through or delete commercials as they appear during the broadcast, their interaction with the remote control device 10 will however provide an opportunity for a media stream of sound and pictures that can make up a variety of different kinds of messages, information and advertisement to be presented upon the screen 14 of the remote control device 10.

Figure 10A:
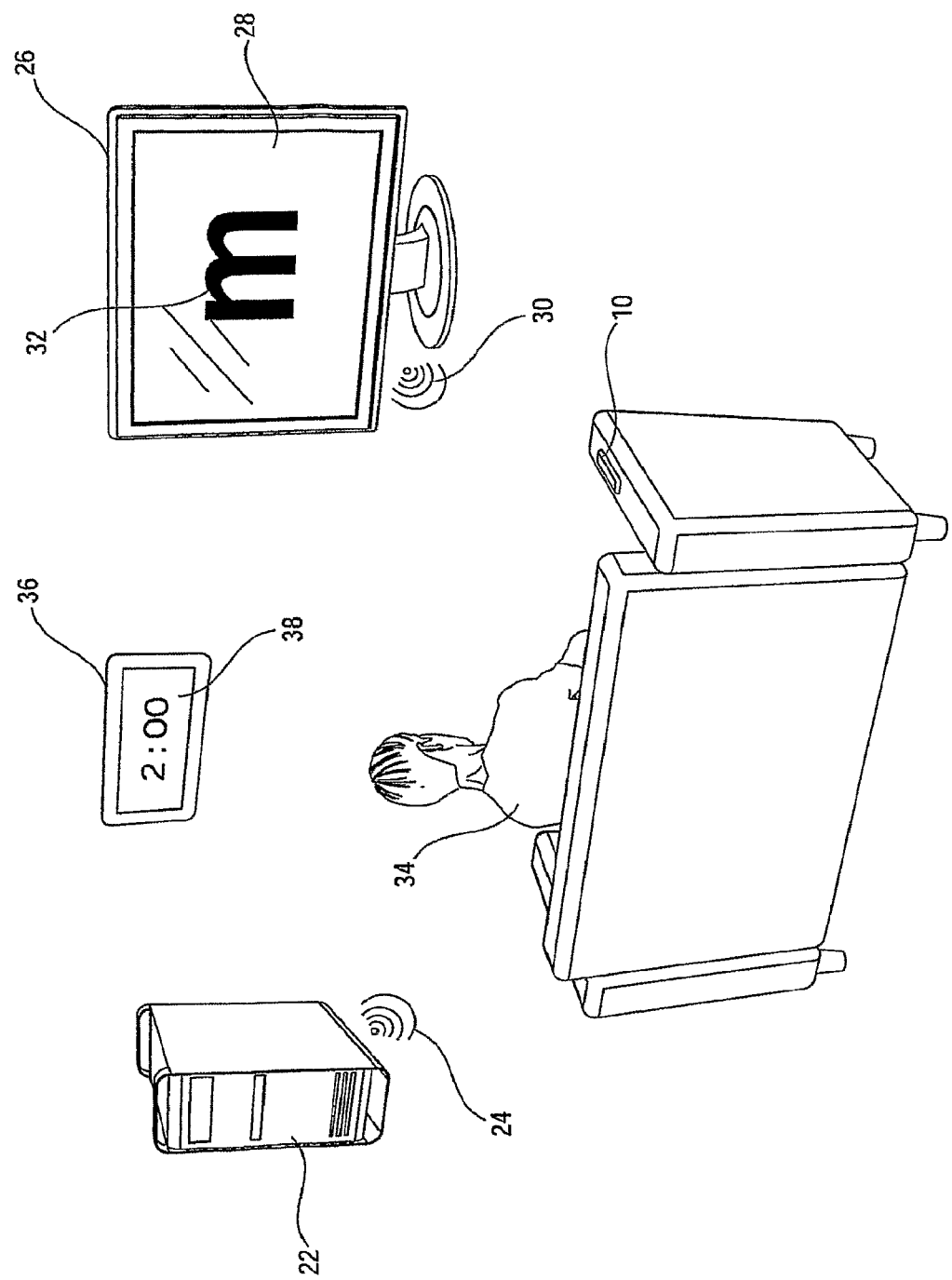
FIGS. 10a, 10b and 10c show a series of systematic representations wherein the ability of the mobile device to be in electronic communication with the server means that messages, information and advertisements being presented on the remote control device can have content associated with the time, place and the programme being broadcast to the viewer.
Figure 10B:
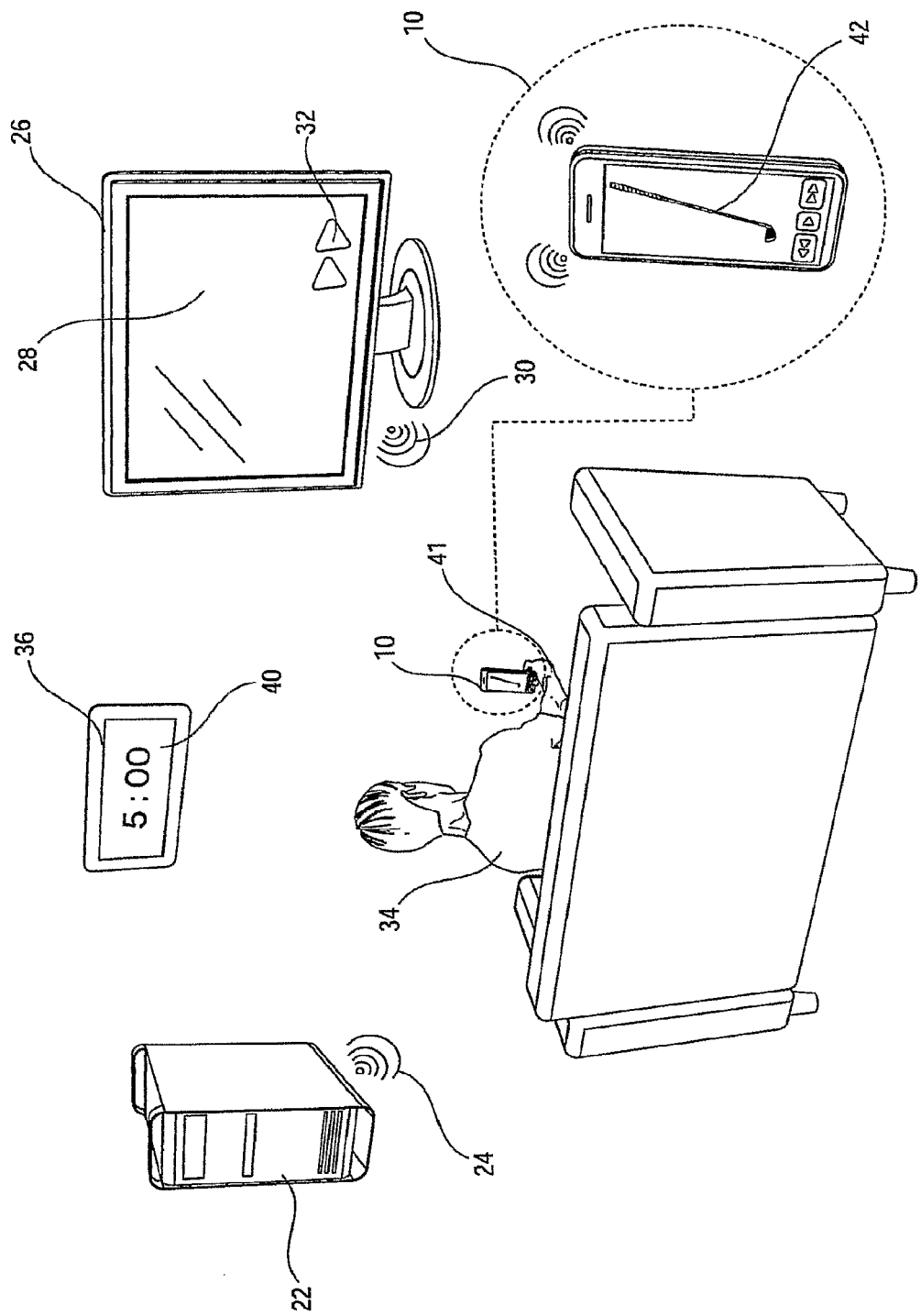
Figure 10C:
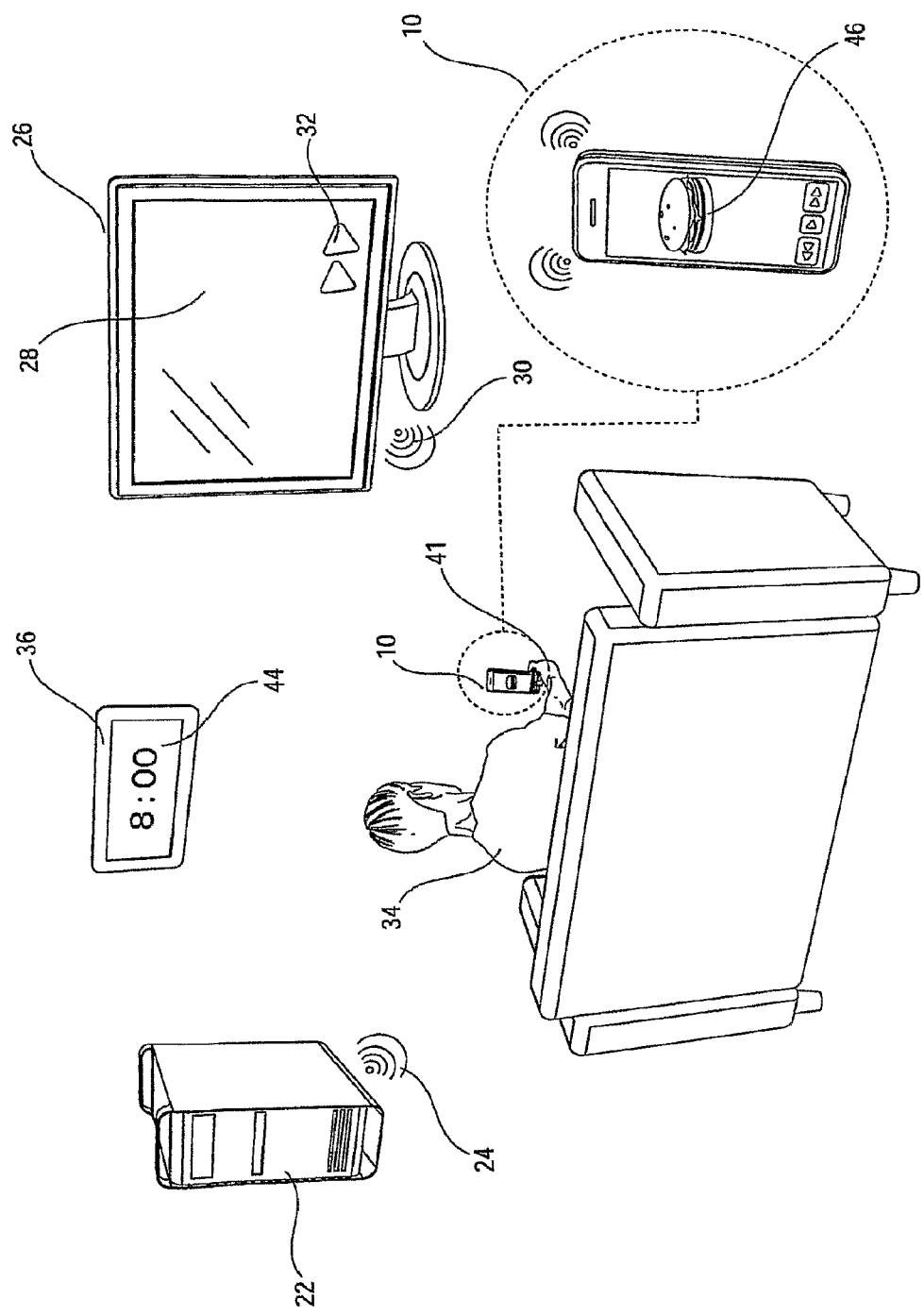

FIGS. 10a, 10b and 10c simply show the advantages with this apparatus, arrangement and method wherein time shifting of a user 34 watching a programming 32 at their preferred time 38 on the television 26 screen 28 can in fact have added advantage to an advertiser using the features described.

Given the hand-held remote control device 10 is in continual wireless communication with the external server 22 means that if the user 34 is watching a programme 32 on the television set 26, at 2.00, as demonstrated on the clock 36, as the programme is a live free-to-air broadcast the opportunity will not be available to the user 34 to fast forward through commercials and the like as they interrupt the broadcasted programme 32.

The user 34 will then have to sit back and watch the commercials that are dictated to him for viewing by the television station and the organisations that fund the advertisement installments included as part of the programme being broadcast.

However, as FIGS. 10b and 10c illustrate, the ability now of the user 34 to utilise time shifting to pre-record their television viewing offers other viewing opportunities.

This can now be completed through providers such as TiVo and Ice TV, where they simply retrieve electronic programming guides, upon for example stand alone set top boxes or in-built receivers for television sets 26, that allows pre-recording of television programmes directly to DVR's and so forth.

As illustrated in FIG. 10B, the user 34 can then sit back at 5.00 in the afternoon and when the commercials appear on the television set 26, the user is able to simply press a button 41 to fast forward 32 these commercials 28 from the programme.

Nonetheless, the moment the user 34 presses one of the buttons that controls the television set 26 there is a real time interaction between the external server 22 and the remote control device 10 so that an exchange of information can be made, firstly about the user's time of viewing, place and programming which can then be translated by the server to send across a particular media stream of sound and pictures of an advertising installment relevant to the viewer at that particular place at that particular time suitable for the program being watched.

For example, in this embodiment as the user 34 fast forwards 32 the commercial 28 from the screened by the touch of the button 41, images of a golf club 42 are shown as an advertising installment for that kind of product upon the monitor of the remote control device.

Hence while the advertisement is being deleted from the television programme advantageously a new form of advertising more relevant to the user's time and place of viewing is then presented to the user as they fast forward through the relevant commercial.

The situation is then represented in FIG. 10c wherein the viewer has decided to watch the programme even later during the evening and so the image 46 presented on the hand-held remote control may be more conducive or acceptable to that time of the evening and also relevant to the place and in context with the programme being viewed.

Figure 11:
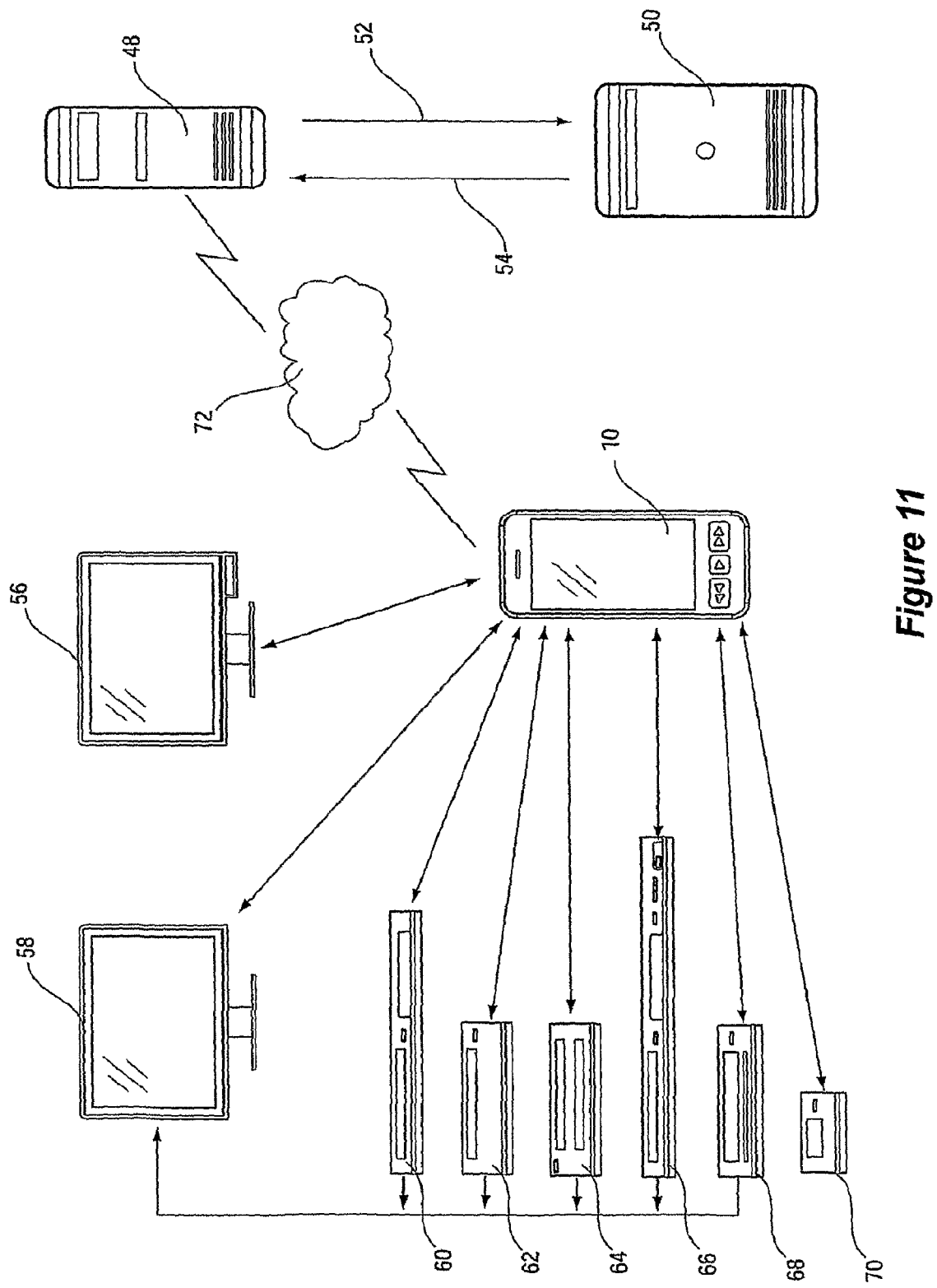
FIG. 11 is a more detailed systematic representation of FIG. 9 showing the way in which the mobile device interacts with a variety of controllable devices to bring about the new media display of messages, information, and advertisement installments upon the display of the mobile device.

As introduced above, FIG. 11 is perhaps a more detailed embodiment of the arrangement wherein the remote control device, as explained, could either be a purposely built remote control to operate a television set 56 or a combination of a variety of electronic devices such as DVD/CD/Blue Ray player 60, free-to-air digital set top box 62, subscriber paid TV digital set top box 64, DVD burner 66, personal video recorder (PVR), digital video recorder (DVR) 68 or even a digital radio receiver 70.

In connection to the remote server 48, while wireless could also be associated with the internet where more detailing and exchange of information not only between the programmes on offer but also information of the user through a two-way exchange of information from the hand-held remote control 10 to the external server 48.

As is to be expected, this external server 48 is continuously in communication transmitting and receiving information from the hand-held remote control device 10.

Nonetheless the information to which is feeds in and transmits to the hand-held remote control can be decided upon by various enterprises, such as marketers, governments or any entity that wants to present their message, information or advertisement to a captive audience who for the most part are using the latest technology in being able to time shift their viewing pleasure to watch their favourite programmes on TV without being interrupted by commercials and public announcements.

However, this interaction between such entities 50 and the external server 48 by way of providing marketing content to be fed to the hand-held remote control device 10 either through the internet 72 or through other various wireless protocols gives a real time ability to send and provide feedback of what the user of the remote control is best suited to receive such information or advertisement of the marketing provider and other related entities 50.

Nonetheless, the interaction of the hand-held remote control device 10 with the various electronic devices including 60, 62, 64, 66, 68, and 70 illustrates that the control of the remote control is not only limited to television broadcasts and the replaying of television broadcasts.

The remote control is able to operate all these kinds of devices therefore when the control is used by pressing any number of function keys, the same activity of sending information to be displayed upon the remote control can still take place.

Importantly it is the controllable device itself that can in fact communicate the content itself or some identity of the content, such as the program header, program or game title, or EPG to the remote control. In this case the remote control is still able to communicate with server 48 the content in order to provide a useful selection parameter for additional multimedia data to be made available to the mobile device and the mobile device user.

Advantageously if someone is watching a DVD, playing a game or even listening to an audio CD, again with the push of a button interaction is made between the remote control device 10, the external server 48 and perhaps beyond even to the marketers and so forth 50 it allows real time exchange to be made to transmit various messages and information to be displayed upon the screen of the hand-held remote control device 10.

Figure 12:
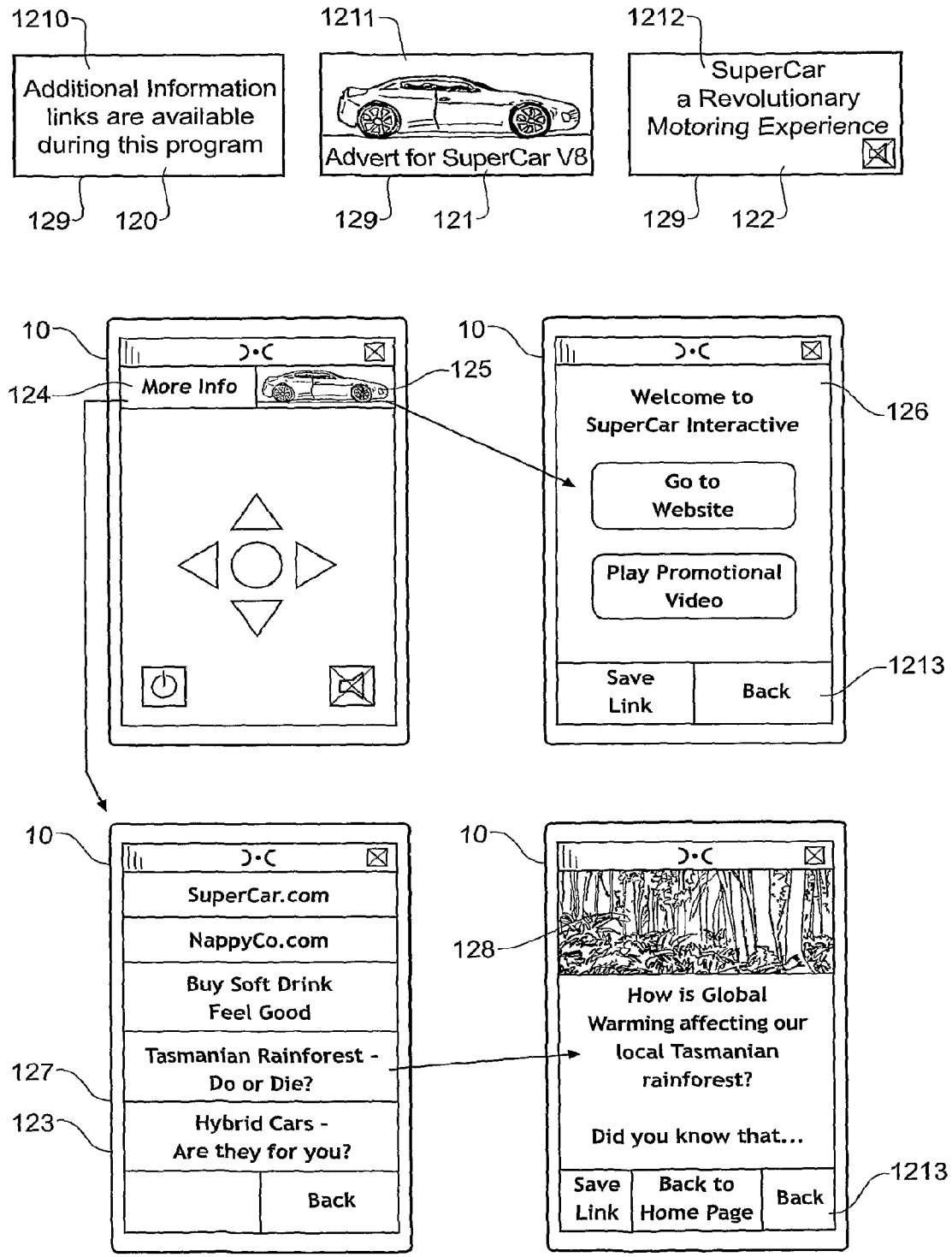
FIG. 12 shows how additional multi-media data may be presented to the display of the mobile device and how a user may interact with this data, in the case where the user is viewing a television broadcast on a television set.

Now referring to FIG. 12. This illustration shows how an embodiment of the invention can be used to present additional multi-media data to the user of a mobile device while watching source multi-media data such as a TV station. A program begins and is displayed to the user on the screen 1210 of the TV 129 once the appropriate TV channel is selected. At the beginning of the program a message appears with the programs ratings, title and a message that "additional information links are available during this program" The user now knows that the mobile device can become more useful than simply a channel changer. An icon 124 appears on the display of the mobile device 10. Further into the program an advert 1211 is presented as part of the normal course of the program. At that time another icon 125 appears on the screen of the mobile device. The user presses icon 125 and briefly looks at the image 126 presented. It is of no interest to the viewer so presses the back icon 1213. The user now presses the "more info" icon 124 to display the list of content available. It includes a list of the sponsors of the program, being the sports car manufacturer, a nappy and soft drink manufacturer.

Additionally there are two more links to related information. These being 127, an article on Tasmanian rain forests and 123, a link to data on hybrid cars. Icon 127 is pressed and the user browses with interest the article on the Tasmanian rain forest 128. The advert 1211 finishes, so the user saves the link by pressing icon 1213 and continues to watch the program.

Figure 13:
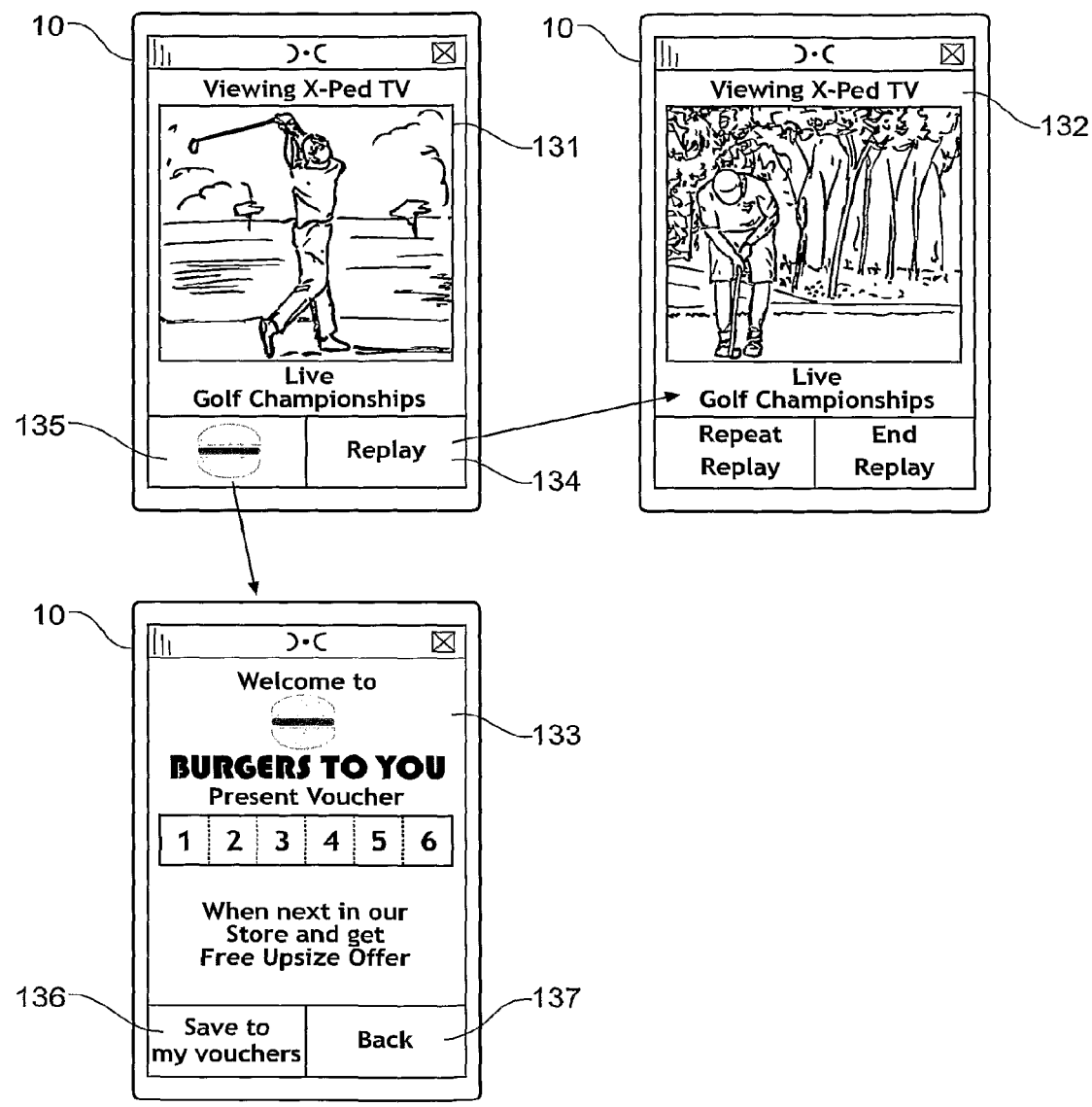
FIG. 13 shows how additional multi-media data may be presented to the display of the mobile device and how a user may interact with this data, in the case where the user is viewing a media stream on the mobile device.

FIG. 13 shows what might be presented on a screen of a mobile device while a user is watching a video stream of data 131 on the display of the mobile device 10. For example, the user may be watching a sporting event when an exciting moment occurs. A "replay" icon 134 is presented on the screen of the mobile device 10 to allow the user to view the moment as many times as desired as shown in 132. During the broadcast a voucher icon 135 appears for a popular burger establishment. The user presses the icon 135 and is presented with screen 133. The voucher is saved to the "my vouchers" folder by pressing icon 136 then returned back to the main screen 131 by pressing the back 137 icon.

Figure 14:
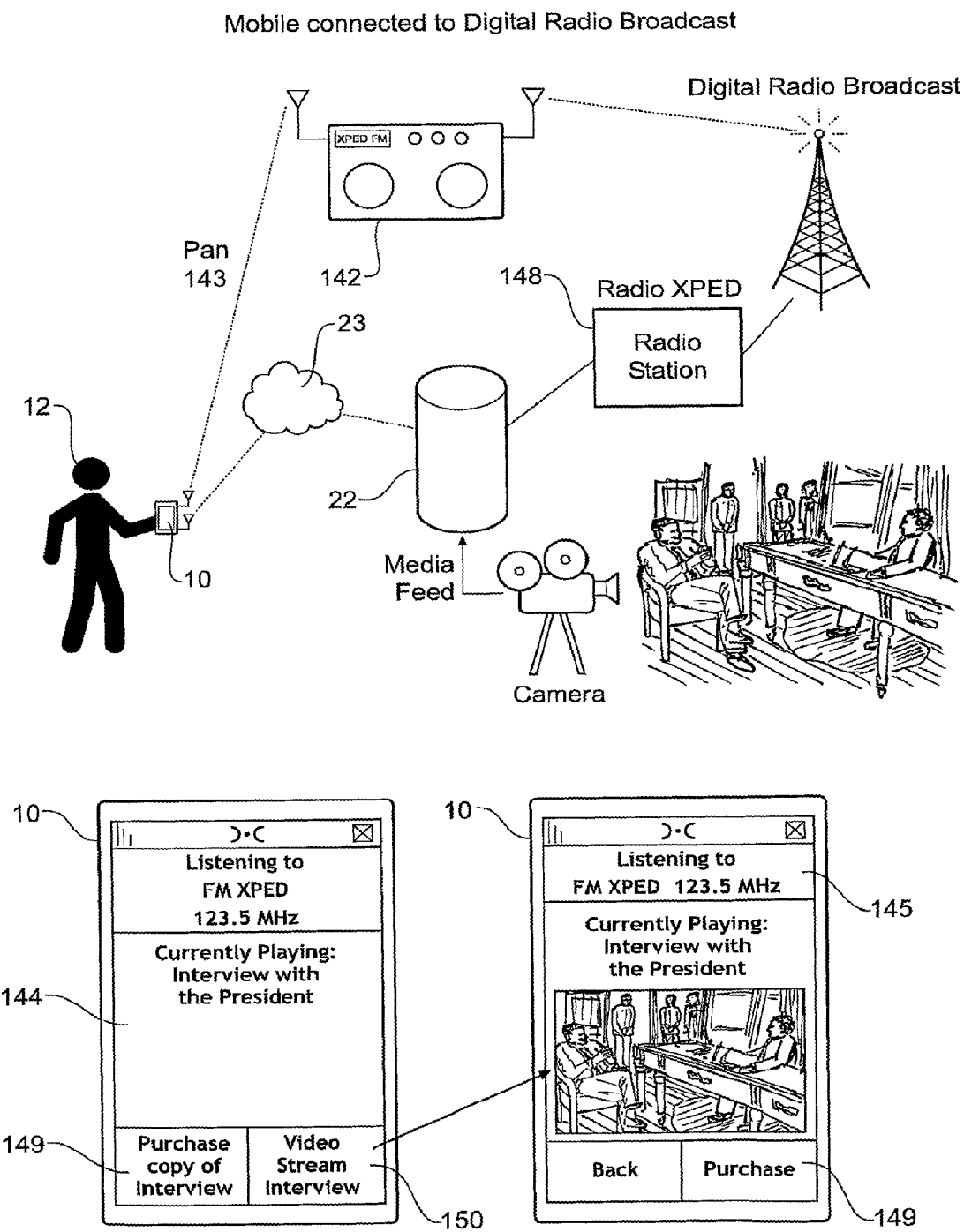
FIG. 14 shows how additional multi-media data may be presented to the display of the mobile device and how a user may interact with this data, in the case where the user is listening to a radio station through an external radio.

FIG. 14 shows the arrangement where a user 12 of a mobile device 10 is using the mobile as a controller and video streamer for the digital radio 142. The mobile 10 is connected to the digital radio 142 using a wireless PAN network 143. The mobile is also capable of wirelessly connecting to a media server 22 located at the radio station 148 using the internet 23. The user uses the mobile device to tune the radio 142 to 123.5 MHZ and proceeds to listen to the programming content. Thus the user 10 has selected the source multi-media data channel. Information such as the title of the current segment "Interview with the President" is presented as well as two additional icons on screen 144. Icon 149 allows the user to purchase a copy of the interview and the second icon 150 allows the user to stream the video of the interview from the radio station server 22 with a single press of the icon. The user presses icon 150 and the video is presented on screen 145.

A similar result can be achieved where a mobile device equipped with an FM and FM RDS receiver is utilised. Screen 144 is still presented to the user of the mobile device 10 with the title and icons 149 and 150 being rendered on the screen by way of the processor processing the data received from the RDS channel. Pressing icon 150 is then still able to connect the user automatically to the radio stations media server 22 and interact using the purchase icon 149.

Figure 15:
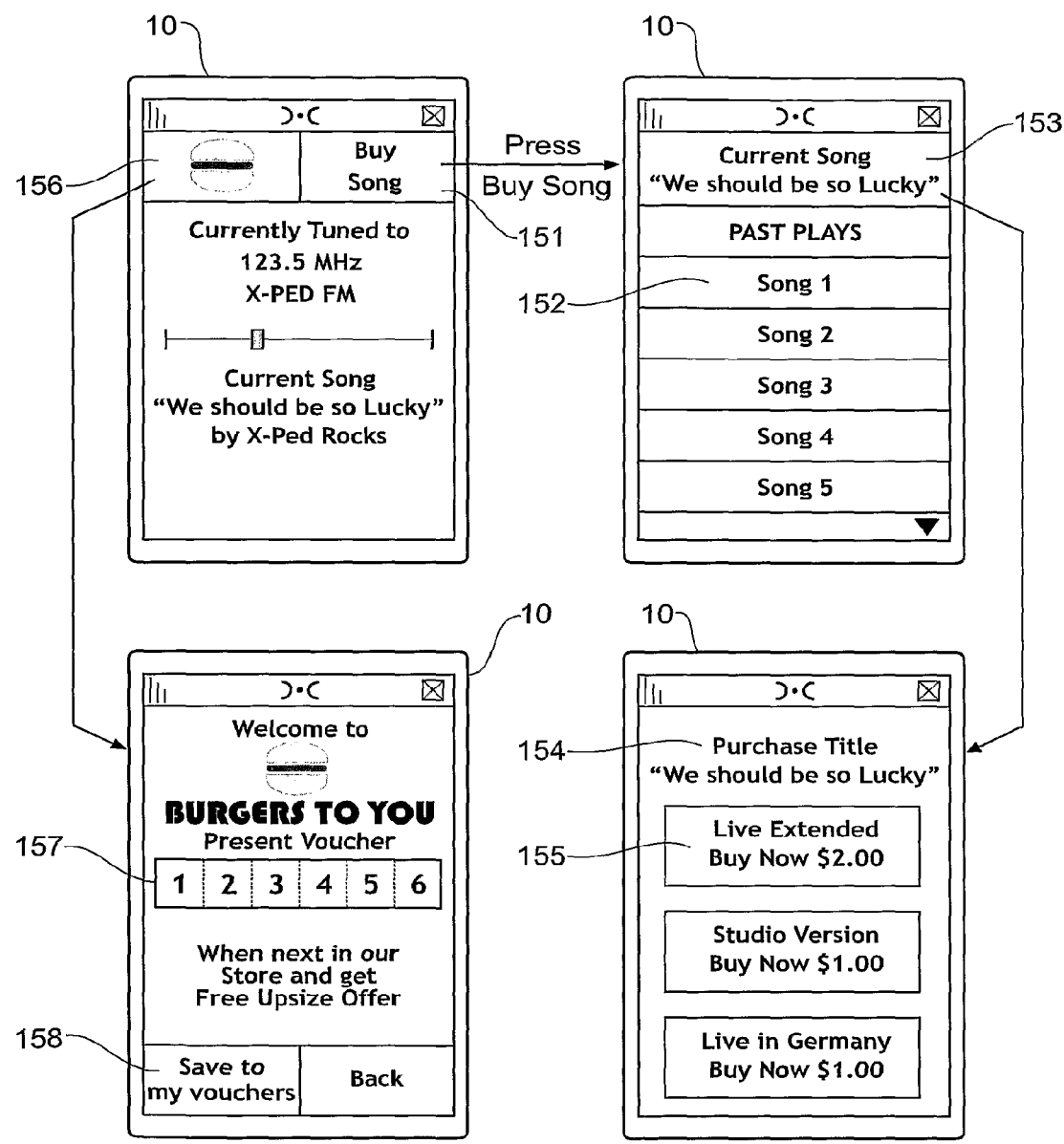
FIG. 15 shows how additional multi-media data may be presented to the display of the mobile device and how a user may interact with this data, in the case where the user is listening to a radio station using the mobile device.

FIG. 15 shows a configuration where a mobile device 10 is being used to listen to a radio station using an in built FM receiver. When a new song starts, a "Buy Song" icon 151 appears on the screen of the mobile device 10. This icon has been rendered by the processor from the data received on the FM RDS channel. The information required to connect to the radio stations media server, such as a URL, is also contained in the FM RDS data, so the user is automatically connected using the Wi-Fi capability of mobile device 10 when the icon is pressed. Pressing icon 151 provides a user a song play history list 152 with the current song 153 being at the top of the list. The user selects the current song 153 and is directed to screen 154 as a direct internet connection now exists with the radio stations media server. The user elects to buy the live extended version 155 of the song. The song can then be downloaded and paid for by an online payment method of choice.

This demonstrates an impulse purchase facility as the user is not required to manually log on to an iTunes or similar media store website.

Additionally an icon 156 appears for a popular burger chain. The user presses the icon 156 and a voucher 157 is presented to the user. The voucher can be a number or other identification mechanism that can be directly presented to the burger outlet or transferred using NFC, RFID, transferred to a loyalty card using wireless near field communications, displayed in the form of a barcode or matrix barcode or encrypted on some other way for presentation and use with the burger establishment. The voucher can be saved to the "My Vouchers" folder 158 for later use.

Figure 16:
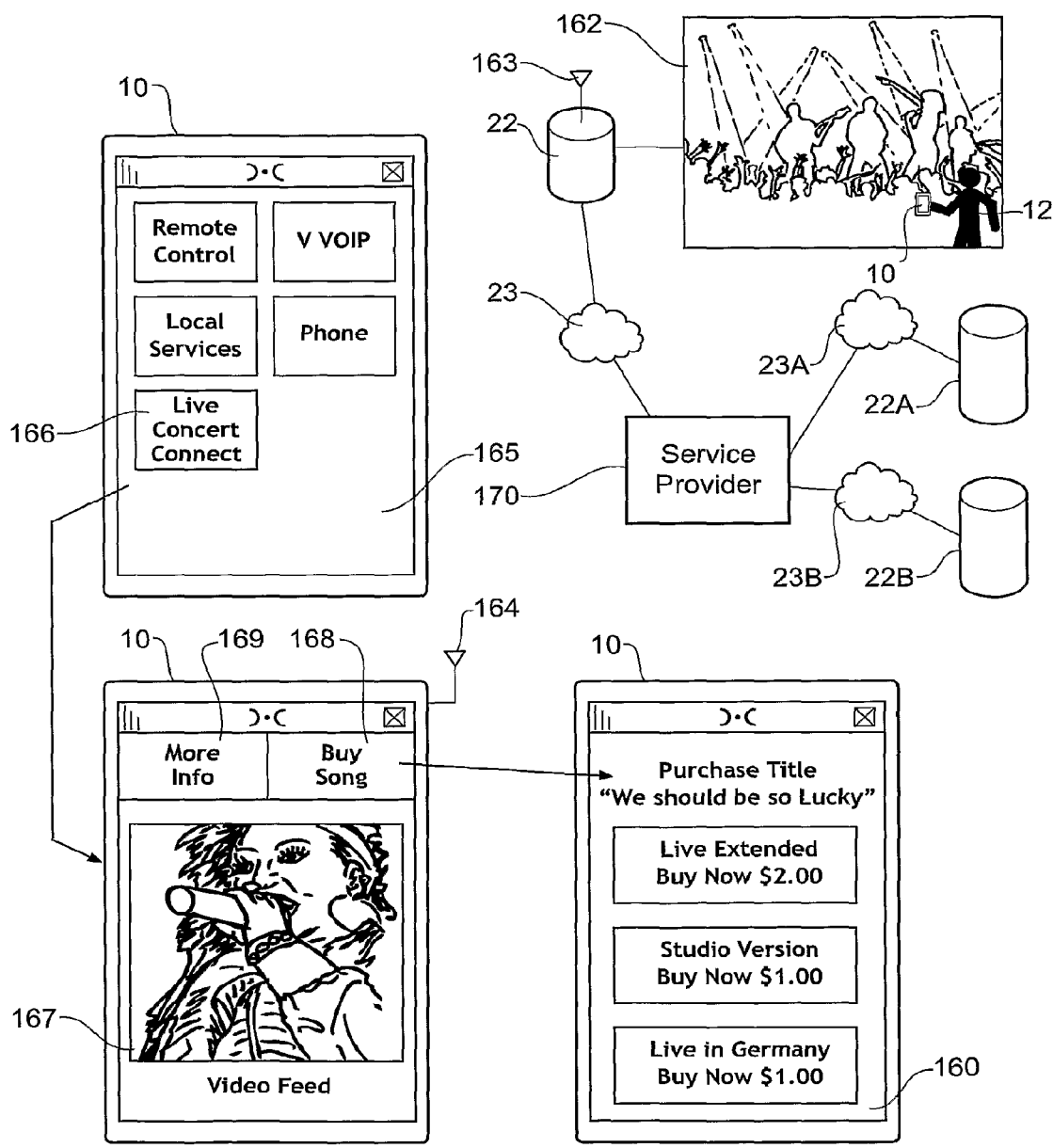
FIG. 16 shows how additional multi-media data can be presented to the display of the mobile device and how a user may interact with this data, while the user is at a live music concert.

FIG. 16 shows how a user 12 of a mobile device 10 might be able to use this invention at a live concert 162. It might be expected that the user has purchased an electronic ticket that has been sent as an attachment to the users email address. The attachment contains an application and some metadata. A program running as part of the operating system on the mobile device such as a mobile phone processes the metadata and has determined that a trigger event, in this case the concert, is required on a certain day and time. Once that day and time arrives the mobile device detects this and then further tries to determine if the user is at the concert. The mobile device program running on the device detects the presence of a wireless network with the same SSID that was presented within the metadata sent. This enables mobile device to determine with a high degree of probability that the user is at the concert and therefore automatically triggers the application, connects the mobile's communication mechanism 164 to the WiFi network 163 provided at the concert and renders an icon 166 that appears on the screen 165 of the mobile 10. The built in vibration element alerts the user's attention to be drawn to the icon that now appears on the screen of the mobile. The user 12, who is indeed at the concert notices the icon and presses it. Screen 167 appears on the mobile 10.

The user is able to receive live video feeds 167 via the wireless communications network and also has been presented options in the form of two icons 168 "Buy Song" and 169 "More Info" on the screen of the mobile device. The user selects icon 168, "buy song" and is presented with the options on screen 160. This enables the user to make a song selection of the current song being played, of which there are three versions to choose. The song is downloaded to the mobile device or sent to an alternative URL or email address, from the media server 22. At the end of the concert the user may also be presented the option to download and purchase the entire concert. The "more info" icon 169 may contain the names and biographical details of the band members or other such data that may be of interest to the user.

In selecting a song that might not be available on the server 22 for the user to download, an additional mechanism may be provided to allow the user to still access the desired song. A service provider 170 could be connected to server 22 through the internet 23. The purpose of this service provider is to provide the ability to manage the finding, downloading and payment of songs from third party servers, indicated by 22A and 22B, being accessible by the service provider through data connections 23A and 23B. This provides a benefit to the user and the owner of server 22. Firstly the owner of server 22 may only be providing the content being delivered at the live concert. Other versions of the song or related content do not need to be prior loaded onto the server 22 thus extending the services to the user. Additionally the user is not required to be directed to any number of additional content providers to access the song. The user is provided a single point of interface for multiple sources. Thus a single user interface and payment method can be utilised.

Additionally, this mechanism can be advantageous in the case where the user is listening to a radio or watching a TV data stream. Since the additional data is provided using a separate communications mechanism, that being 23, there will be no need to exit and therefore interrupt the source media data stream which is commonly the case with the current state of the art.

In the case where a user is not equipped with a suitably equipped mobile device or has not purchased a ticket using the e-ticket method, mobile devices may be hired out or made available through a dispensing machine at the venue using credit card as security over the device.

Figure 17A:
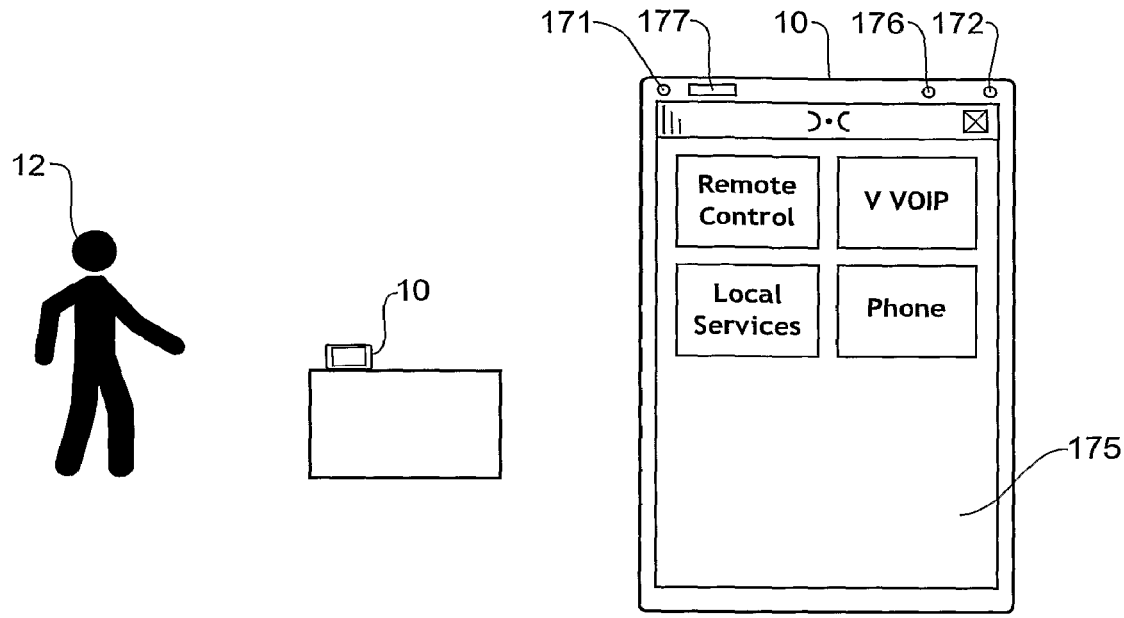
FIG. 17a shows a mobile device having user proximity and user detection features in an a state when the user has not been detected.
Figure 17B:
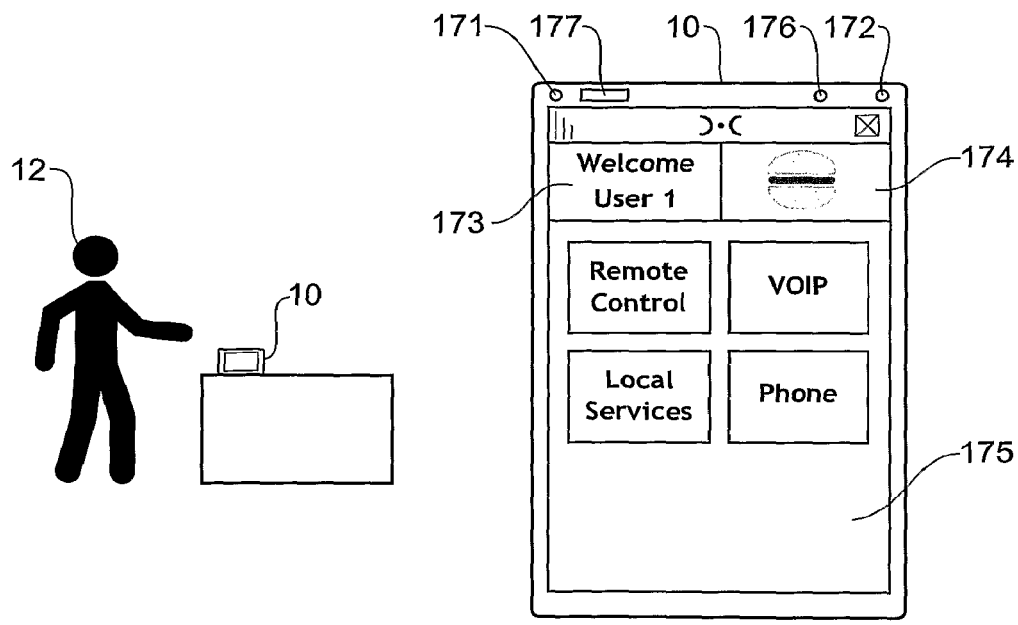
FIG. 17b shows a mobile device of FIG. 17a detecting the users presence.

In another embodiment of the invention as shown in FIGS. 17A and 17B, the mobile device 10 can be equipped with additional sensors such as a camera 172, proximity sensor 173, capacitive sensor 175 which may be a hover function of the display or in some other form, heat or Infra-red sensor 176, finger print scanner 177, etc. The purpose of these could be for detecting that a user 12 is within the vicinity of the mobile device 10 and even further using appropriate software and set-up processes detect the identity of that user.

For example, the proximity detection circuit could cause the mobile device to exit its power down mode and power up to be ready for user input using a user interface mechanism. The camera could, through the use of video image processing software, determine the identity of the user and provide a personalised greeting and provide additional multi-media data relevant to that user. Alternatively the user could use the finger print scanner 177 to as a mechanism for user identity or log on.

FIG. 17a shows the situation where a mobile device is not in sleep mode, but has not yet detected the presence of user 12.

FIG. 17b shows the situation where the mobile device has detected the presence of the user, and also identified the user and provided a personalised welcome message and advert appropriate to that user.

Figure 18:
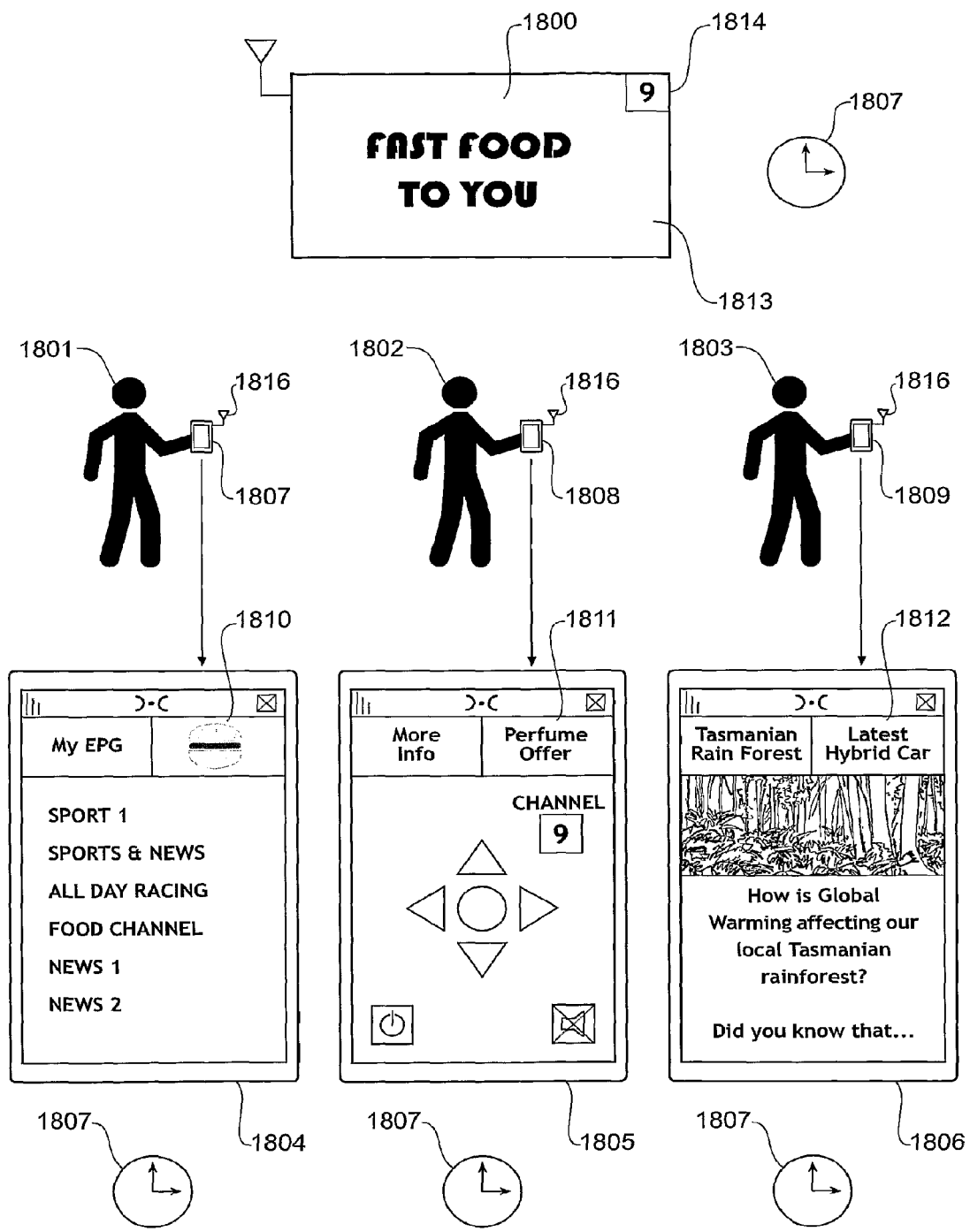
FIG. 18 shows an arrangement where additional multi-media data can simultaneously present different data to multiple viewers of the same television broadcast.

FIG. 18 shows a multi controller arrangement where three viewers 1801, 1802, and 1803 have their own mobile devices. At a particular time 1807, an advert 1813 starts on the TV 1800. The source multi-media data presents to all viewers the standard "Fast food to you" advert 1813 as determined by the broadcaster of the program. However at that same time, each mobile device receives customised additional information icons as determined by the lifestyle learning assistant running on the mobile devices to determine the preferences and likes of the individual users.

User 1801 of mobile device 1807 receives a leading burger token 1810 as the lifestyle learning assistant running on this mobile knows this user is a frequent customer of this establishment. User 1801 also has a mobile device customised EPG guide 1804 and is looking at what sporting program to record. The mobile device knows the user 1801 like sports, so the sport channels are at the top of the customised EPG guide.

User 1802 of mobile device 1808 is female and receives a perfume offer 1811 as she purchased an item from a leading cosmetics store in the last 28 days. The cosmetics store has sponsored this advert in the hope to get he and similar customers back to that store. This user has ignored the icon and decided to watch the advert 1813 or read.

User 1803 of mobile device 1809 has a keen interest in reducing their carbon footprint on the planet and therefore has decided to watch this program about the Amazon rainforest. The mobile 1809 has only just been purchased, so there is no lifestyle learning history or user profile other than the minimum data obtained from the standard mobile registration details. However this mobile is aware of the channel that was selected by user 1802 with mobile 1808 through monitoring the PAN network traffic 1816. The channel selected is visually represented by the channel selector data 1815 on the mobile screen 1805 and the TV channel indicator 1814 on the TV screen 1813. The lifestyle learning assistant needs to make some context aware assumptions to be able to deliver the most appropriate additional multi-media data to this user. Firstly, it assumes the user 1803 is in the vicinity of the TV channel selector mobile 1808 due to a strong PAN signal strength. Secondly it assumes the use is watching this program as the more info icon has been pressed, thus presenting to the user 1803, screen 1806 on mobile device 1809. Thirdly the mobile device knows from built in accelerometers that the mobile is in the hand of the user. As a result of these situational aware parameters it makes a determination of high probably that this user is watching program 1813. The last assumption the mobile device makes is that the user is interested in "green" topics as they are watching the program presented on the TV, and as such delivers the most closely related additional multi-media data, that being the hybrid car advert 1812.

Figure 19:
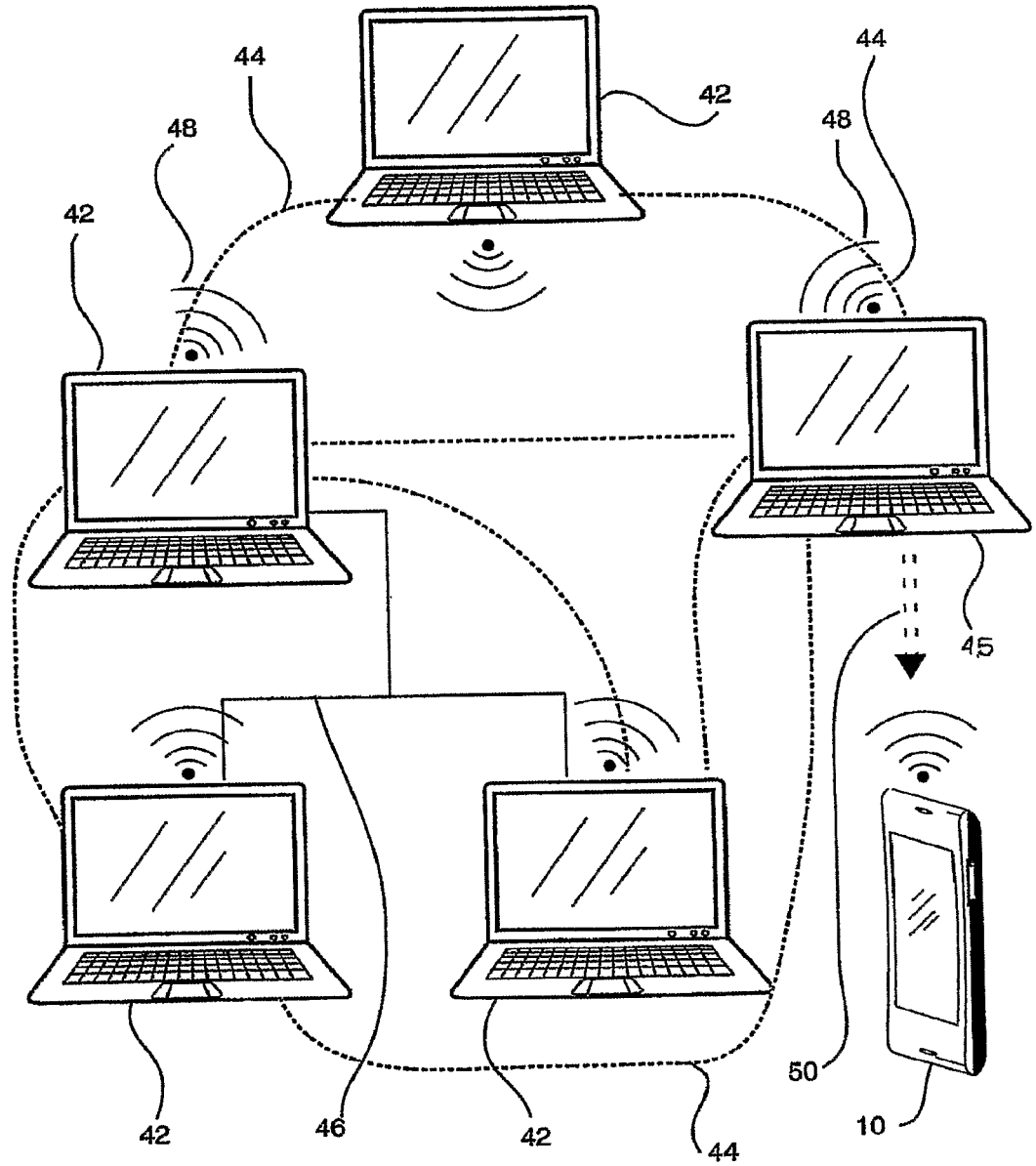
FIG. 19 shows schematically a preferred embodiment of the invention relating to the use of flash player or other protocol, in order for a user of a mobile device to experience speed advantages of peer to peer networking without using such communication protocol running on the mobile device, in the downloading of the files, images and/or applications to the mobile device.

FIG. 19 shows schematically a further preferred embodiment of the invention relating to the use of flash player, or other suitable protocol in order for a user of a mobile device to experience speed advantages of peer to peer networking without using such communication protocol in the downloading of the files, images and/or applications to the hand held mobile device.

As in typical peer to peer networking arrangements there is a sharing of the processing power, and storage capacity of a variety of network computers interconnected as nodes which are regularly advertising their capabilities and needs to other nodes 42 within the peer to peer group.

Nonetheless in this particular embodiment the PC connected computer shown as number 45 while part of the peer to peer networking arrangement that includes the other nodes referred to as 42 that are interconnected either wirelessly 48 or through hard LAN cabling 46, is also in communication with the mobile device 10.

Initially the user runs a peer to peer networking protocol from PC 45 that begins gathering the data for the file through its exchange with those other nodes 42 that are part of the peer to peer grouping. As introduced above once the first packets are received they are encrypted and wrapped up in flash player or similar protocol and streamed if streaming is supported over a wireless connection to the hand held mobile device 10 with a media player with security decryption. If streaming is not supported the file ill be transmitted upon being completely assembled. Once the packets arrive at the mobile device 10 they are decrypted and may be viewed immediately.

For example the person skilled in the art could see the application as presented in FIG. 19 wherein a user is watching a major sporting event and an additional icon appears on the screen of the mobile showing the profile of the player that last kicked the goal. As could be appreciated, potentially millions of viewers could attempt to access this server data within a few seconds by pressing this icon. It is this situation that a peer to peer network will be most advantageous in ensuring the data is delivered to the screen in the least time with minimal amounts of pausing or freezing of the streamed data.

Figure 20:
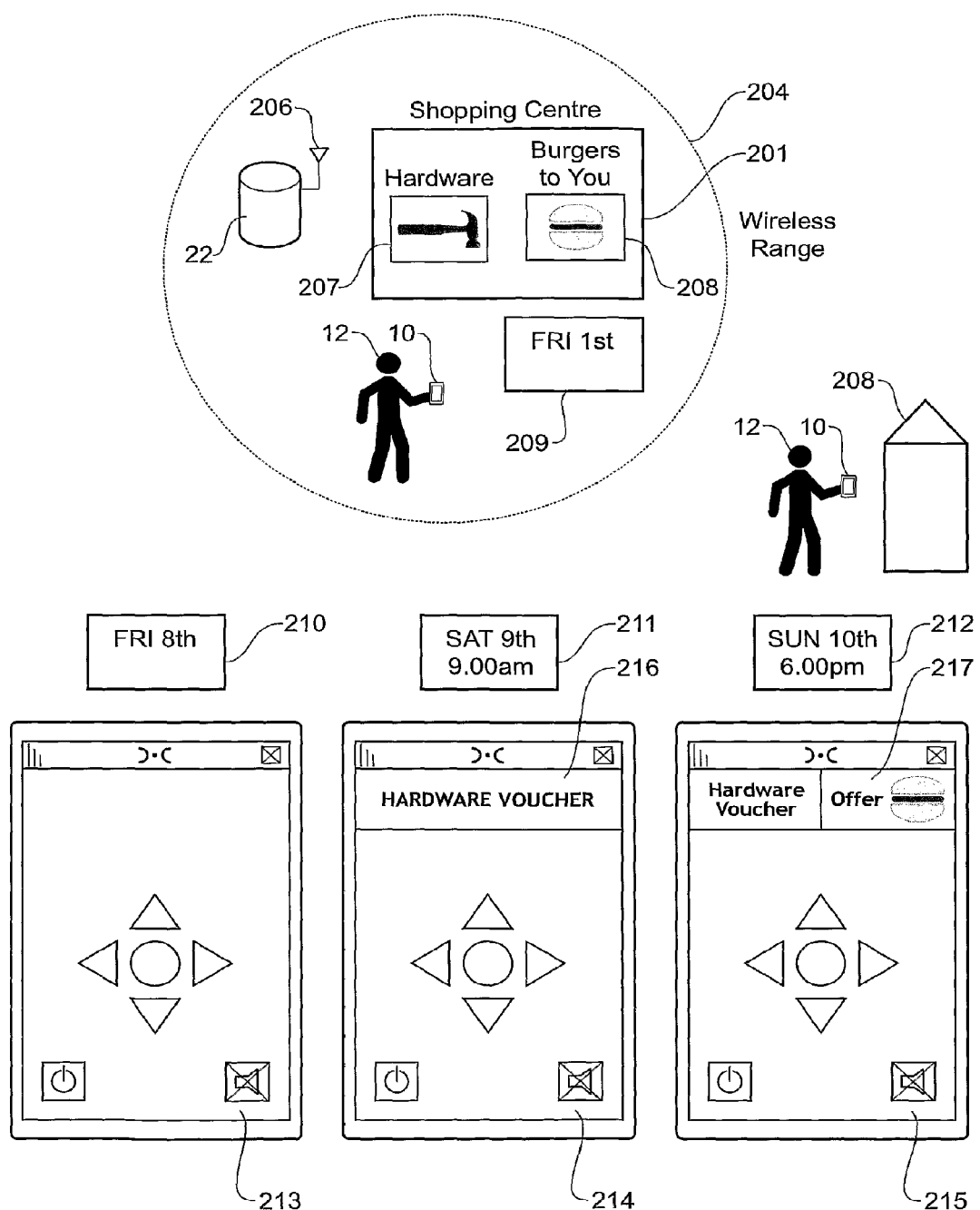
FIG. 20 shows an arrangement where a user of a mobile device logs onto a wireless network of a store. Some time later the user has left the proximity of the wireless network to return home. Still additional time later, additional multi-media data in terms of catalogues, vouchers and other offers are presented to the user on the display of the mobile device, even though the device is no longer connected to any wireless networks or servers.

FIG. 20 shows the situation where a user 12 of a mobile device 10 has entered a shopping centre or precinct 201 providing a data server 22 to deliver content and services using a wireless network 206 to customers. On entering, the user consents to having access to the wireless network and any offers that may be available to customers. During that time the user visits a hardware store 207 and eats at a burger outlet 208. While within the wireless range 204 of the shopping centre, the hardware store and burger outlet have downloaded additional multi-media data in the form of electronic vouchers or catalogues over the wireless network 206 to the memory of the mobile device 10 of the user 12 during the time of visit indicated by 209, that being Friday 1st. Some days later on Friday the 8th as indicated by date 210, the user 12 of the mobile device and the mobile device itself 10 are located at the users home 208 which is located outside the wireless range 204 of the shopping centre. At this time and date 210, the screen of the mobile device remains unaffected by the additional multi-media data as seen in 213. That is, they currently reside in the memory of the device, but have not yet been awakened or triggered to function.

The processor of the mobile device 10 could be running an application to monitor these downloaded advertisement messages which may be data files or indeed applications themselves. The monitor application could have been downloaded by the user from an app store, transferred to the mobile device over the wireless network while the user was within wireless range of the shopping centre, or any other number of ways. However, the preferred embodiment is where the processor has a set of daemons, functions or software drivers that are natively part of the operating system already running on the mobile device as such, no requirement exists for the user to download or install another application.

The next day Saturday 9th as indicated by date 211, at 9.00 AM, the processor has detected that the trigger conditions of the additional multi-media data have been satisfied and as such automatically presents to the user 12 a message 216 as indicated on the screen 214 of the mobile, being a hardware gift voucher which if pressed could further present to the user a discount or other incentive for that user to return to the store. Additionally on Sunday 10th at 6.00 PM as indicated by 212, the user is presented another offer 217 from the burger establishment as indicated on screen 215.

The important point to be made here is that this additional multi-media data (in this example adverts and messages) have been presented automatically, as determined by a preset set of conditions despite the fact that the user and indeed mobile device is no longer within the wireless range of the shopping centres wireless network 204 that had been previously visited.

Figure 21:
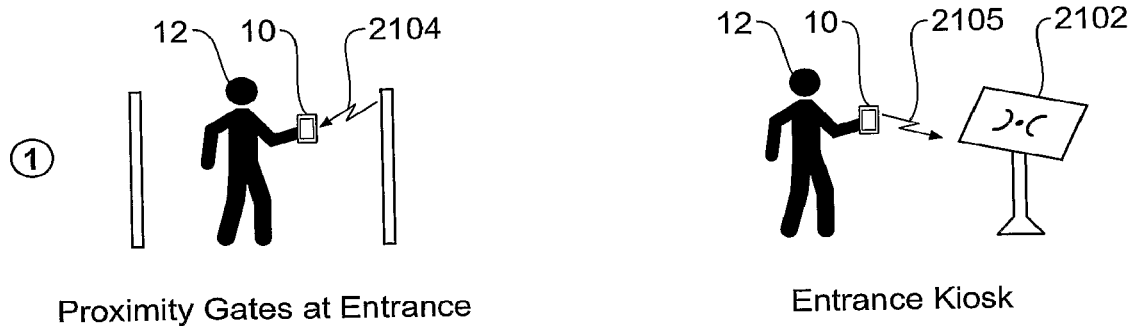
FIG. 21 shows an arrangement where a user of a mobile device logs onto a wireless network of a retail store using access points such as a kiosk or proximity gates, and during the time the user is in the store the mobile device is in communication with a server, thus when the user checks out, a list of purchases and additional multi-media data is sent to the mobile device using near field proximity communications.
Figure 21:
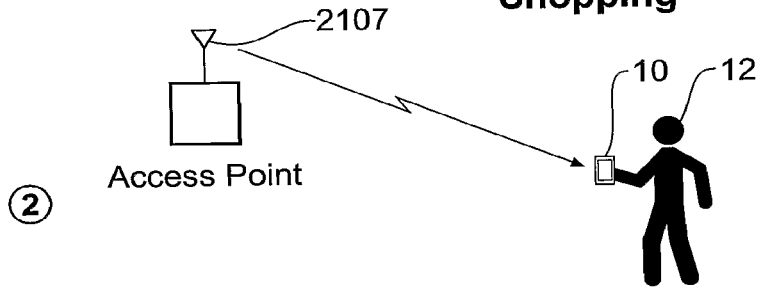
Figure 21:
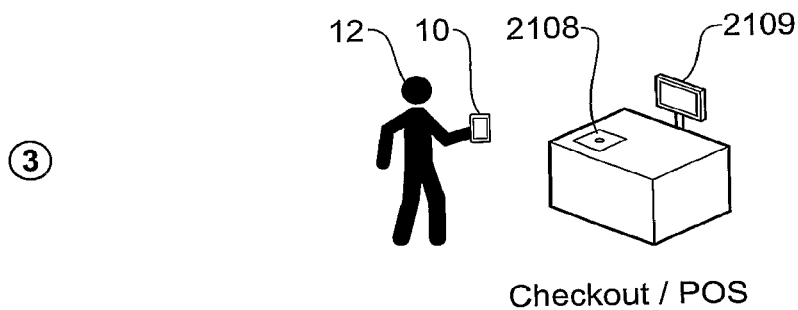

FIG. 21 represents in more detail one possible mechanism of getting additional multi-media data onto a mobile device. The user 12 enters a store within a shopping centre. At the point of entry the user could pass through proximity gates 2103 carrying mobile device 10. At that point the proximity gates can communicate with the mobile device 10 using a RFID or similar mechanism 2104 to detect the user is now in the store. Alternatively the user can touch the mobile device to a kiosk 2102 at the entry point equipped with Near Field Communication 2105. In either case the mobile device can be logged on to the local wireless network and have access to data on a server via access point 2107. While in the store, content such as catalogues, vouchers or larger files including media streams may be accessed or downloaded. When the user has completed shopping, the mobile device 10 is touched onto the NFC pad 2108 at the POS checkout 2109. At this instant additional information such as vouchers, specials or adverts could also be sent to the memory of the mobile device that is associated with the list of purchases made.

Figure 22:
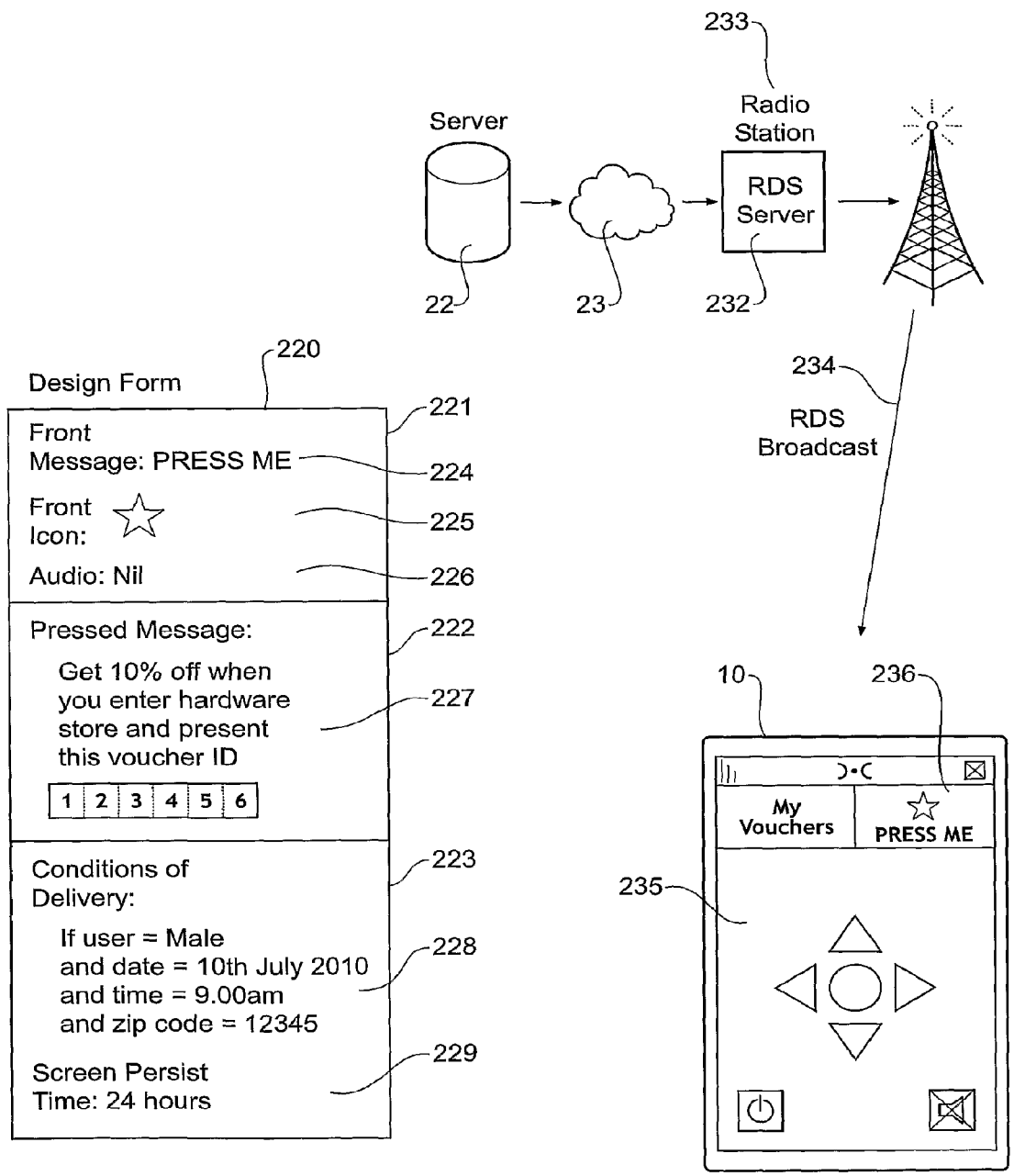
FIG. 22 shows how a service provider could design an additional multi-media data presentation which includes trigger events in the case where the data is sent using the FM RDS wireless system and is then presented on the screen of the mobile device.

FIG. 22 shows an implementation where the FM RDS service is used as a mechanism to transmit data and associated trigger information to a suitably equipped mobile device. This system could provide a mechanism for establishments to very easily present a simple message to a user or demographic. A manager of a content server could provide an entry form to an establishment assisting them to design the message and method of presentation of that message to a potential group of customers.

What is graphically illustrated is a design form 220 containing three main entry fields, being the presentation screen 221, the message screen 222 and the trigger condition screen 223.

In the presentation screen 221, the text message 224 would be entered as being that message that appears on the message icon. The icon 225 could be a simple bit map representing a logo, etc and the option to present audio to the device could be entered at 226. In this case there is no audio alert.

The message screen 222 could contain the data presented to the screen of the mobile device once the user has pressed the icon. In this case a simple text message is presented 227.

Finally the trigger conditions entry screen 223 is used to define when, how and to whom the message icon 236 is presented on the screen 235 of the mobile device 10. In this case the message will be presented on Jul. 10, 2010 at 9.00 AM if the user is male and within a region ZIP code 12345. Also the message will dwell or persist on the screen for 24 hours as indicated by dwell time 229.

This form can then be submitted by the establishment to the server 22 to be sent over the internet 23 to the RDS server 232 at the radio station 233 for transmission on the next available broadcast slot.

At the appropriate time and to the appropriate target audience, that being males within post code 12345, the message icon 236 is presented to the screen 235 of the mobile device 10.

Figure 23:
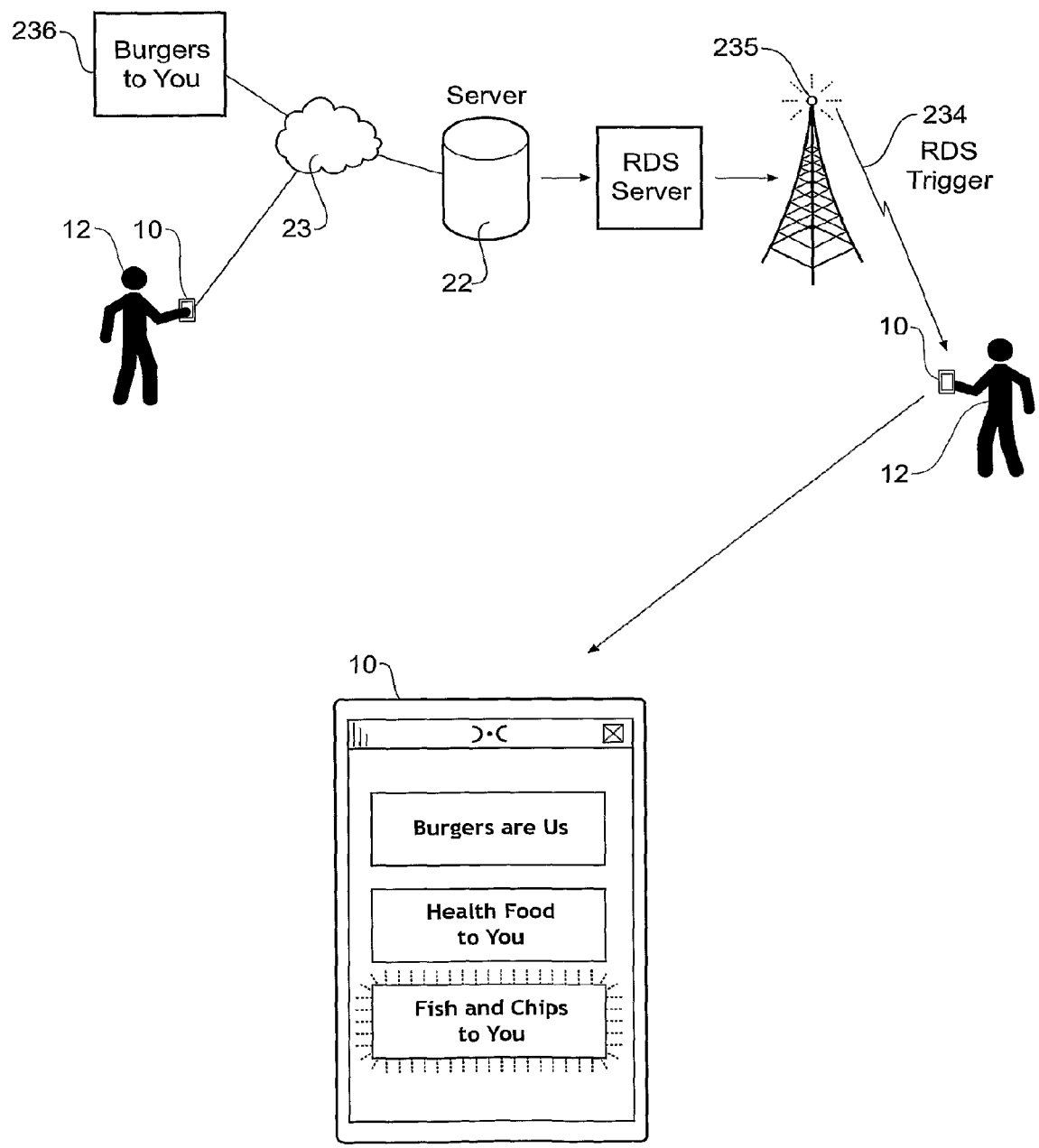
FIG. 23 shows how a user could select a local services directory and the fast food restaurant has used an FM RDS transmitted trigger to highlight their listing to the user.

FIG. 23 shows a situation where an establishment, in this case a burger chain has placed a listing on a local services server allowing users of mobile devices to be made aware of services. Importantly this diagram shows a mechanism where from time to time the burger chain may wish to highlight their entry on the local services listing, which might be contained within the memory of the device and at a time when the mobile device is not even connected to a wireless network.

A user 12 may from time to time be able to connect a mobile device 10 wirelessly to a local services data server 22 using the internet 23 to access a listing of local shops, services, contractors and the like. This listing may be downloaded and stored in the memory of the mobile device and therefore accessible even when the mobile is not connected to the wireless network. However it may be advantageous for an establishment like a burger chain 236 to run a series of TV adverts to promote their establishment. The result of this there may be a number of viewers of the advertising campaign that choose to search their local services directory to find out more details, such as closest store, address, etc for that burger chain. In a situation where the mobile device 10 is wirelessly connected to the server 22, the burger chain could simply present an advertising icon or additional information alert as has been described previously and simultaneously be able to highlight the local services listing so as to attract the user's attention when visiting the listing. However, if the mobile is not connected wirelessly to the server 22, is there ordinarily no mechanism to get a message to the mobile device and therefore create the listing.

However a suitably equipped mobile device 10 may receive an RDS trigger 234 from an FM transmitter 235 of which has access to a data server 22 of which the burger chain 236 has a subscription. In this way, a mechanism has been created to allow the establishment to modify the data present in such a listing that has already loaded onto the mobile, even when that mobile has no access to a data server.

An additional option is for mobiles to be pre loaded at the point of manufacture with messages or adverts representing establishments willing to pay for such a service. The advantages in this embodiment are that the establishment's message can be presented to the user of the mobile even if the mobile is never connected to a wireless network. The data may even have been pre loaded into the memory of the mobile device at the time of manufacture.

Figure 24A:
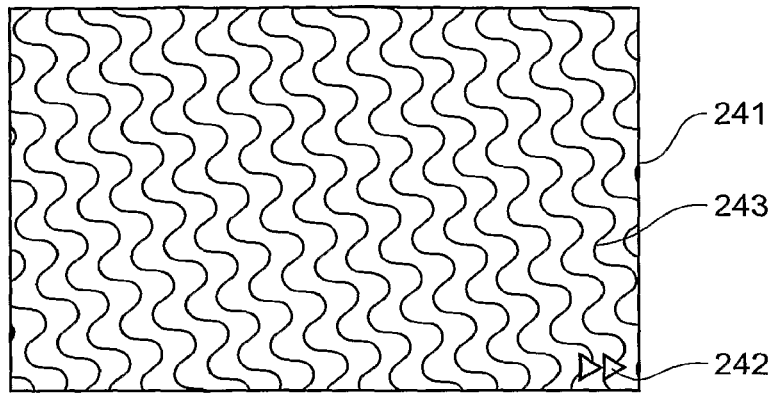
FIG. 24a, b and c where

FIG. 24a shows the situation where a picture is distorted 243 on a screen 241 during the time when the program is being fast forwarded, as indicated by the fast forward process 242 being initiated.

Figure 24B:

FIG. 24b shows the situation where the distorted picture is replaced with a still image or slow video 244 during the time of fast forward. The content to be displayed at this time may originate from the source multi-media or the device providing the source multi-media, but it may in preference come from the mobile device. Advantageously this would allow content to be presented that was under the control of the user or at least indicative of the users preferences.

Figure 24C:
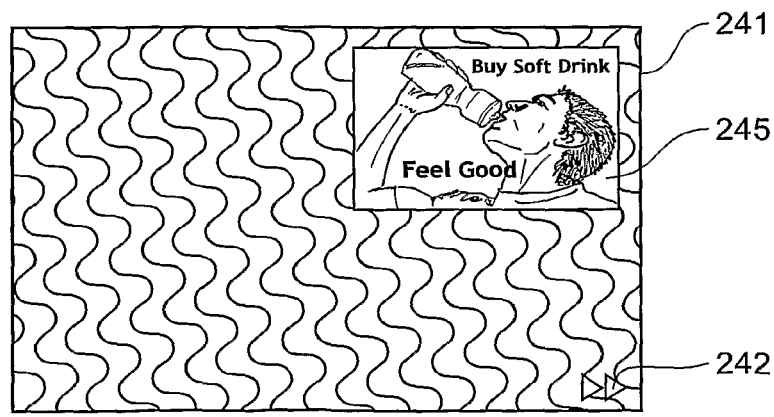

FIG. 24c shows the situation where additional multi-media data 245 is presented on the screen using a picture in picture mechanism.

Figure 25:
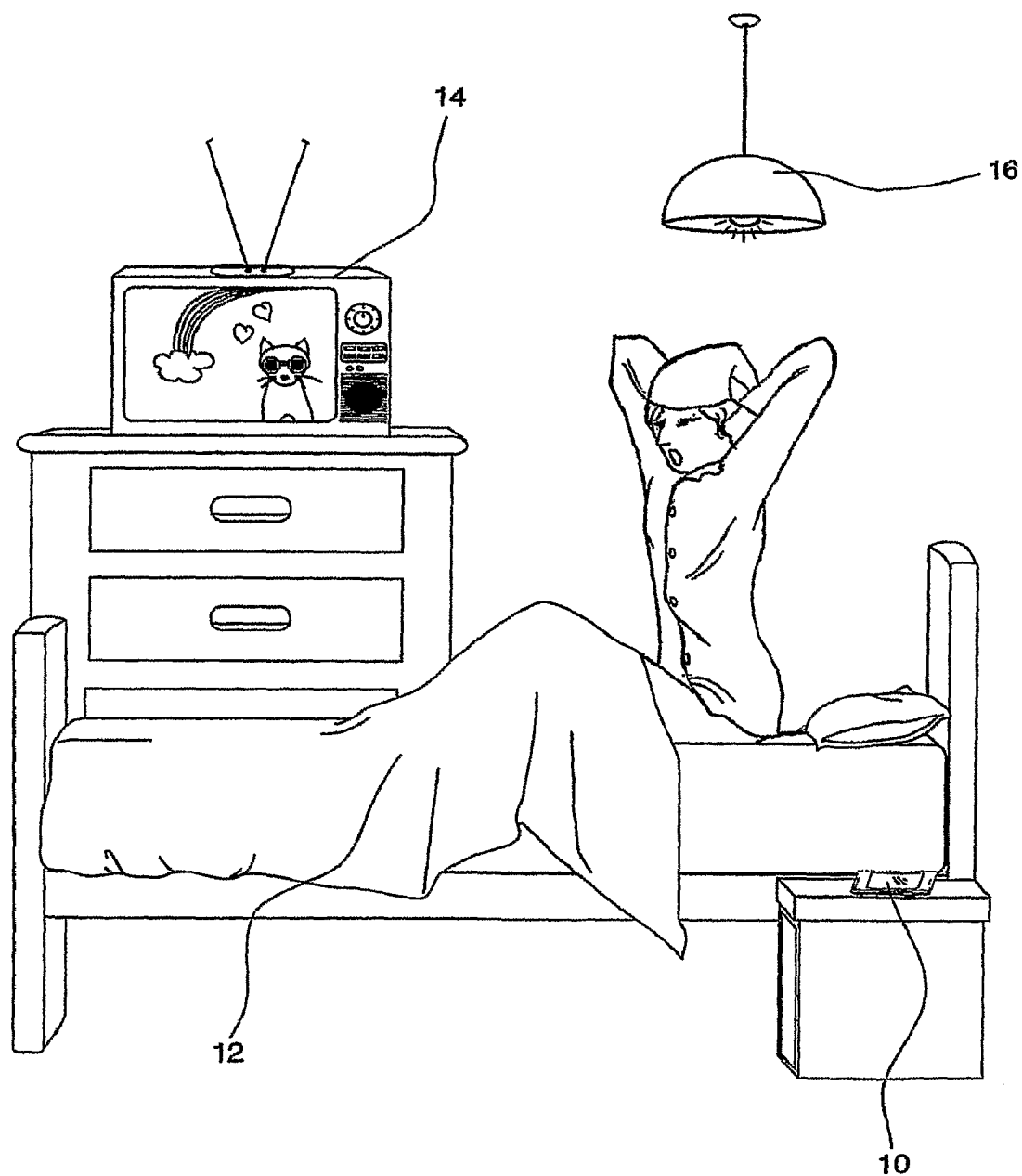
FIG. 25 show schematically, an example as to how in, one preferred embodiment of this invention the hand held electronic device is able to assist a user, who in this scenario is being assisted in awakening and attending to the appointments in their day and then subsequently making their way to the office.

In FIG. 25 rather than having the electronic device 10 simply instigate an alarm it is communicating with a stereo system 14 such that once 6.30 a.m. arrives, the sound of the user's favourite song will be broadcast upon the stereo 14 and the lighting 16 in the user's room will slowly illuminate so that the user is not uncomfortably presented with bright lights upon awakening. Additionally the accelerometers in the mobile device will detected that the user picks up the device and that therefore it is timely to present to the user a message icon inviting the user to a favourite breakfast establishment frequented by the user, the enticement being a free fresh squeezed juice.

Figure 26:
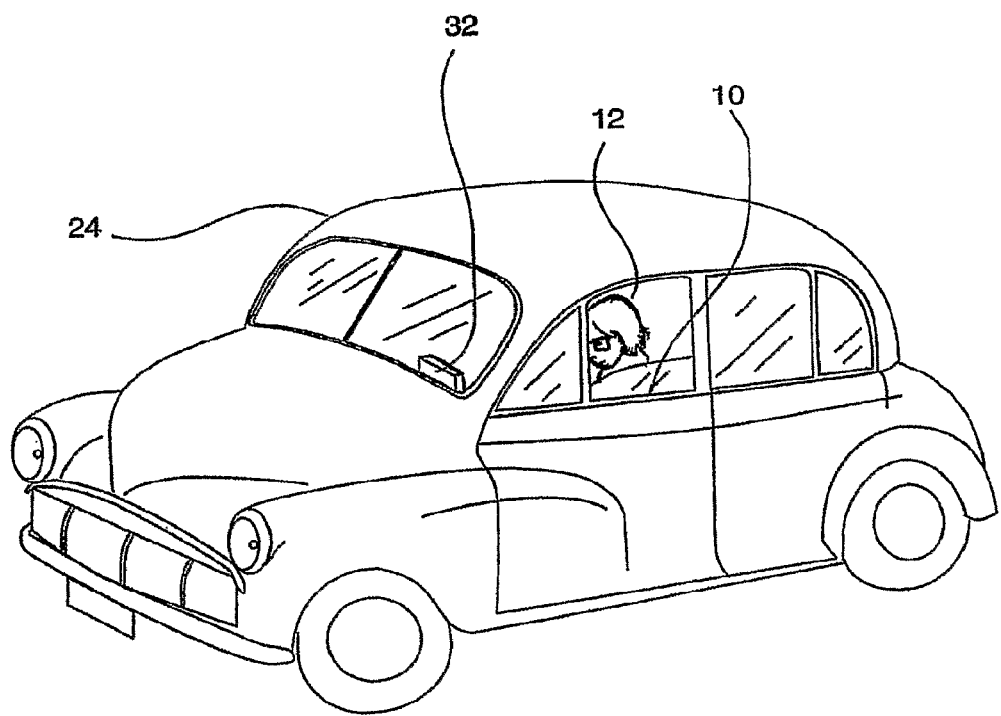
FIG. 26 shows a further application wherein the user of the device in a preferred embodiment of the invention is in the context of driving a vehicle.

FIG. 26 then expands upon this proactive relationship the electronic device 10 has with the user 12 in order to assist in the user's 12 daily activities to get to the first appointment on time.

Once the user 12 is inside the vehicle 24 the electronic device then commences communication with the GPS mapping out and providing continual information on the best way in which the user should make their way to the chiropractor.

For example if the normal route was congested for there had been an accident or the like, given the electronic device had checked with various traffic route databases or information it can act in real time advising the user 12 to take alternative faster routes and provide any further information with voice-based turning instructions if need be.

In taking this route, the user 12 passes within broadcast range of the breakfast establishments wireless network. As previously determined by the mobile device this user is a loyal customer and has previously consented to receiving specials and vouchers and the like. As such, an offer is allowed to be downloaded to the memory of the mobile device.

However the mobile device is aware that the user is driving in a car though GPS, accelerometer and other inputs and therefore determines that in the interest of safety it is not an appropriate time to present messages of this nature to the user.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

The invention claimed is:

1. A control and presentation system capable of providing data, wherein the data is at least one of source data or additional data, to a user of a mobile device and for controlling the mobile device, the mobile device having a processor, memory, one or more wireless communication mechanisms including at least a near field communication mechanism, and a user interface mechanism, the system comprising;
    a data store for storing the data and for making the data available using a wireless communication mechanism;
    a near field data communication device for transmitting at least part of, or identification of the data which includes at least one trigger condition to the mobile device within near field communication distance when a user brings the mobile into near field communication proximity of the near field data communication device; and
    wherein the mobile device, using one or more wireless communication mechanisms:
        stores, in the memory of the mobile device, the data transmitted from the near field data communication device, determines, using the processor of the mobile device and independent of user interaction, when the at least one trigger condition is true, and if the at least one trigger condition is true, controls the user interface mechanism of the mobile device to present at least a portion of the data stored in the memory to the user of the mobile device.

2. A control and presentation system according to claim 1 wherein when the mobile device is in near field communication distance with a terminal, a trigger condition is true causing one or more of the data or a related message to be presented to the user of the mobile device by the user interface.

3. A control and presentation system according to claim 2 wherein the trigger condition are formed from logical or algorithmic combinations of events.

4. A control and presentation system according to claim 2 wherein the trigger condition includes one or more of the group of conditions of: time; location of the mobile device; user input; frequency modulation (FM) radio data system (RDS) signal; radio frequency identification (RFID) signal; detection of a wireless network; digital broadcast signal; wireless network signal; proximity to a near field communication (NFC) device.

5. A control and presentation system according to claim 4 wherein the NFC device is in the proximity of a precinct.

6. A control and presentation system according to claim 4 further comprising:
at least one broadcast medium device to broadcast one or more of the group of broadcast mediums; an FM RDS signal; an RFID signal; a digital broadcast signal wherein the signal includes data or triggers or both.

7. A control and presentation system according to claim 6 wherein the data includes one or more of the group of data representative of catalogues; coupons; vouchers; media streams; specials relating to a retail sales environment.

8. A control and presentation system according to claim 6 wherein the data stored in the memory of the digital device is searchable.

9. A control and presentation system according to claim 6 wherein the data represents a financial transaction.

10. A control and presentation system according to claim 6 wherein the data represents a multi-media data.

11. A control and presentation system according to claim 6 further including: at least one NFC device associated with a point of sale terminal.

12. A control and presentation system according to claim 6 further including: at least one NFC device associated with a kiosk terminal.

13. A control and presentation system according to claim 1, wherein the trigger condition is based on a location of the mobile device.

14. A control and presentation system according to claim 1, wherein the trigger condition is based on an elapsed time between the transmission of the data from the near field communication device and the determination of whether the at least one trigger condition is true.

15. A method of control and presentation for providing data, wherein the data is at least one of source data or additional data, to a user of a mobile device and for controlling the mobile device, the mobile device having a processor, memory, one or more wireless communication mechanisms including at least a near field communication (NFC) mechanism, and a user interface mechanism, the method comprising the steps;
storing data in a data store and for making the data available using a wireless communication mechanism;
providing a NFC device for transmitting at least part of, or identification of data including at least one trigger condition to the mobile device within near field communication distance when a user brings the mobile into near field communication proximity of the near field data communication device,
wherein the mobile device, using one or more wireless communication mechanisms:
stores, in the memory of the mobile device, the data transmitted from the near field data communication device,
determines, using the processor of the mobile device and independent of user interaction, when the at least one trigger condition is true, and
if the at least one trigger condition is true, controls the user interface mechanism of the mobile device to present at least a portion of the data stored in the memory to the user of the mobile device.

16. The method of claim 15 including the further step of:
setting a trigger condition to be one or more of the group of: time; location of the mobile device; user input; frequency modulation (FM) radio data system (RDS) signal; radio frequency identification (RFID) signal; detection of a wireless network; digital broadcast signal; wireless network signal; proximity to a near field communication (NFC) device.

17. The method of claim 15 including the further step of:
setting a trigger condition to be the proximity of the mobile device within near field communication distance of a POS terminal.

* * * * *